(12) United States Patent
Rajan et al.

(10) Patent No.: US 10,504,187 B1
(45) Date of Patent: Dec. 10, 2019

(54) FUND ALLOCATION CONFIGURATION

(71) Applicant: Guidewire Software, Inc., Foster City, CA (US)

(72) Inventors: Seshadhri Pakshi Rajan, Belmont, CA (US); Luis Arturo Diaz, Redwood City, CA (US)

(73) Assignee: Guidewire Software, Inc., San Mateo, CA (US)

( * ) Notice: Subject to any disclaimer, the term of this patent is extended or adjusted under 35 U.S.C. 154(b) by 486 days.

(21) Appl. No.: 14/578,235

(22) Filed: Dec. 19, 2014

Related U.S. Application Data

(60) Provisional application No. 62/043,864, filed on Aug. 29, 2014.

(51) Int. Cl.
| | |
|---|---|
| *G06Q 40/08* | (2012.01) |
| *G06F 16/2457* | (2019.01) |
| *G06F 16/248* | (2019.01) |
| *G06Q 40/00* | (2012.01) |

(52) U.S. Cl.
CPC .......... *G06Q 40/08* (2013.01); *G06F 16/248* (2019.01); *G06F 16/24578* (2019.01); *G06Q 40/12* (2013.12)

(58) Field of Classification Search
None
See application file for complete search history.

(56) References Cited

U.S. PATENT DOCUMENTS

| | | | | |
|---|---|---|---|---|
| 2013/0226798 A1* | 8/2013 | Orttung | ............... | G06Q 20/027 705/44 |
| 2013/0325710 A1* | 12/2013 | Hoshing | ............. | G06Q 20/102 705/40 |
| 2015/0032599 A1* | 1/2015 | Agapitov | ............ | G06Q 20/227 705/39 |

* cited by examiner

*Primary Examiner* — Robert R Niquette
(74) *Attorney, Agent, or Firm* — Van Pelt, Yi & James LLP

(57) ABSTRACT

Applying funds is disclosed. A set of interfaces for configuring filtering criteria and receiving user configurations of the filtering criteria is displayed. Fund information pertaining to a fund that is to be applied to one or more receivables under an insurance policy account is received. A set of eligible receivables is identified based on filtering information included in the fund information and a set of preconfigured filtering criteria. A set of ranked receivable partitions to which the fund is applied is established based on a set of preconfigured priority criteria and using the fund information and information associated with the set of eligible receivables. The fund is applied to the ranked receivables partitions according to the rankings.

16 Claims, 11 Drawing Sheets

FUND ALLOCATION CONFIGURATION

CROSS REFERENCE TO OTHER APPLICATIONS

This application claims priority to U.S. Provisional Patent Application No. 62/043,864 entitled FUND ALLOCATION CONFIGURATION filed Aug. 29, 2014 which is incorporated herein by reference for all purposes.

BACKGROUND OF THE INVENTION

Insurance carriers send out and receive high volumes of invoices and payments. Performing reconciliation of such volumes of invoices using the payments can be time-consuming and resource-intensive. Further compounding the difficulty of performing reconciliation is that the manner in which payments are to be applied may depend on a variety of factors. Given the high volume of payments to be processed and the myriad scenarios that may affect how the payments should be applied, performing payment reconciliation can be complex and error-prone for billing agents using existing payment systems. Moreover, whenever a policy owner makes changes to the policies, it is frequently difficult to determine how the changes would affect payments and how to incorporate the changes in the existing payment processing flow. Existing systems often require changes to be specially programmed.

BRIEF DESCRIPTION OF THE DRAWINGS

Various embodiments of the invention are disclosed in the following detailed description and the accompanying drawings.

FIG. 7 is an example of an interface for configuring a payment allocation plan.

FIG. 9 is an example of an interface for configuring a return premium plan.

FIG. 10 is an example of an interface for viewing a summary of an account.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
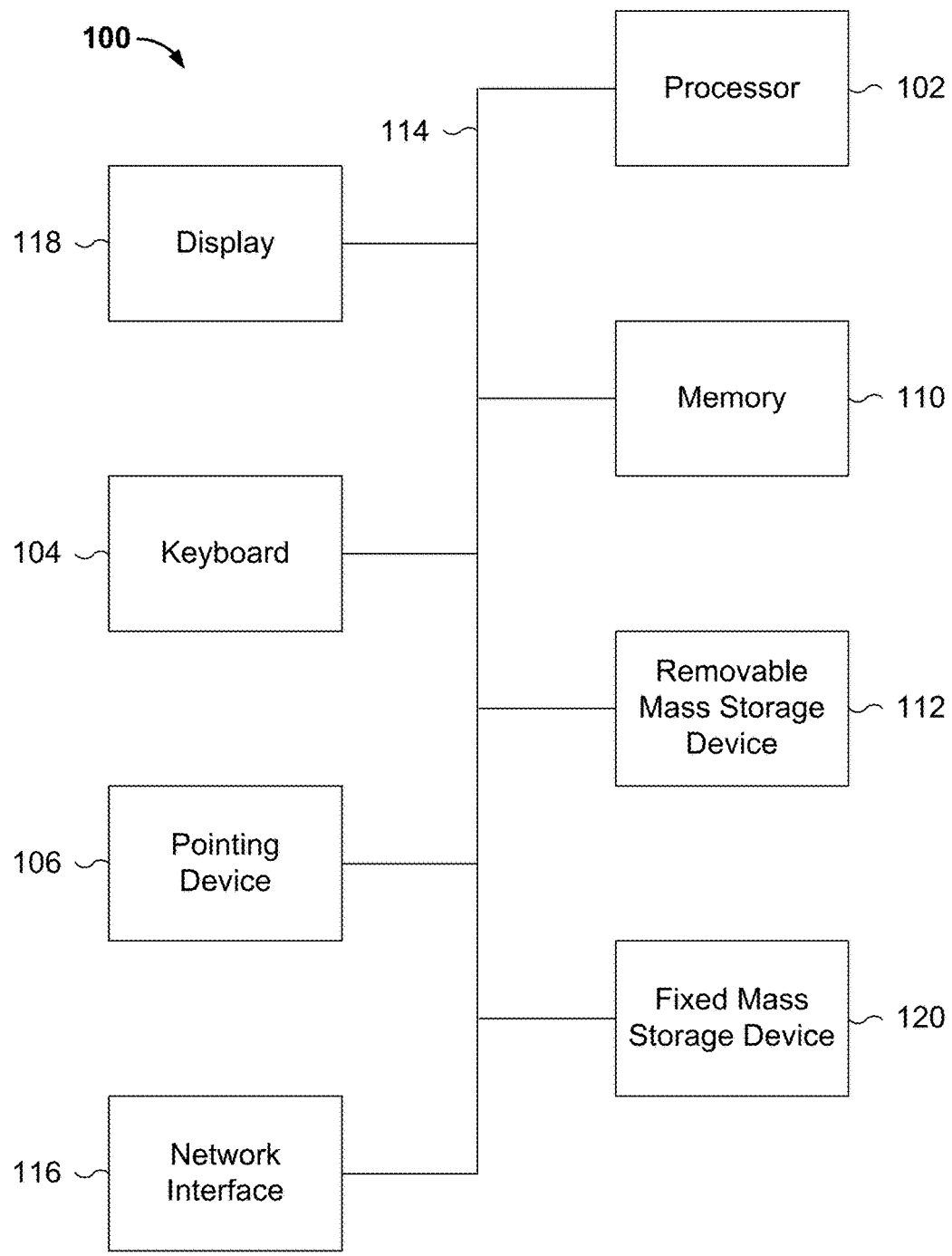
FIG. 1 is a functional diagram illustrating an embodiment of a programmed computer system for configuring funds allocation.

FIG. 1 is a functional diagram illustrating an embodiment of a programmed computer system for configuring funds allocation. As will be apparent, other computer system architectures and configurations can be used to facilitate configuring funds allocation. Computer system 100, which includes various subsystems as described below, includes at least one microprocessor subsystem (also referred to as a processor or a central processing unit (CPU)) 102. For example, processor 102 can be implemented by a single-chip processor or by multiple processors. In some embodiments, processor 102 is a general purpose digital processor that controls the operation of the computer system 100. Using instructions retrieved from memory 110, the processor 102 controls the reception and manipulation of input data, and the output and display of data on output devices (e.g., display 118). In some embodiments, processor 102 includes and/or is used to facilitate configuring funds allocation.

Processor 102 is coupled bi-directionally with memory 110, which can include a first primary storage area, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 102. Also as is well known in the art, primary storage typically includes basic operating instructions, program code, data, and objects used by the processor 102 to perform its functions (e.g., programmed instructions). For example, memory 110 can include any suitable computer readable storage media, described below, depending on whether, for example, data access needs to be bi-directional or uni-directional. For example, processor 102 can also directly and very rapidly retrieve and store frequently needed data in a cache memory (not shown).

A removable mass storage device 112 provides additional data storage capacity for the computer system 100 and is coupled either bi-directionally (read/write) or uni-directionally (read only) to processor 102. For example, storage 112 can also include computer readable media such as magnetic tape, flash memory, PC-CARDS, portable mass storage devices, holographic storage devices, and other storage devices. A fixed mass storage 120 can also, for example, provide additional data storage capacity. The most common example of fixed mass storage 120 is a hard disk drive. Mass storage 112, 120 generally store additional programming instructions, data, and the like that typically are not in active use by the processor 102. It will be appreciated that the information retained within mass storage 112 and 120 can be incorporated, if needed, in standard fashion as part of memory 110 (e.g., RAM) as virtual memory.

In addition to providing processor 102 access to storage subsystems, bus 114 can also be used to provide access to other subsystems and devices. As shown, these can include a display 118, a network interface 116, a keyboard 104, and a pointing device 106, as well as an auxiliary input/output device interface, a sound card, speakers, and other subsystems as needed. For example, the pointing device 106 can be a mouse, stylus, track ball, or tablet, and is useful for interacting with a graphical user interface.

The network interface 116 allows processor 102 to be coupled to another computer, computer network, or telecommunications network using a network connection as shown. For example, through the network interface 116, the processor 102 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Additional mass storage devices (not shown) can also be connected to processor 102 through network interface 116.

An auxiliary I/O device interface (not shown) can be used in conjunction with computer system 100. The auxiliary I/O device interface can include general and customized interfaces that allow the processor 102 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a non-transitory computer readable medium that includes program code for performing various computer-implemented operations. The computer readable medium is any data storage device that can store data which can thereafter be read by a computer system. Examples of non-transitory computer readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 1 is but an example of a computer system suitable for use with the various embodiments disclosed herein. Other computer systems suitable for such use can include additional or fewer subsystems. In addition, bus 114 is illustrative of any interconnection scheme serving to link the subsystems. Other computer architectures having different configurations of subsystems can also be utilized.

Insurance carriers offer insurance related products and services such as insurance policies that provide coverage for risk items. The various insurance related products and services are associated with receivables, for which payment amounts are due from insurance policy account holders. For example, a single policy can be associated with any number of charges for various insurance elements, such as premiums for coverages, taxes, fees, state assessments, etc.

In managing the billing for the receivables associated with provided products and services, the insurance carrier sends out invoices to insurance policy account holders and collects payments received from the policy account holders. The insurance carrier then performs payment reconciliation to reconcile the collected payments to clear open receivables/charges.

Reconciling collected funds such as received payments with receivables can be complex and challenging. For example, having received a payment, the insurance carrier is tasked with determining what receivables are eligible to be paid by the payment, as well as how the payment should be distributed among the set of eligible receivables. The determination of the set of eligible items and the manner in which funds should be distributed among the eligible items can vary significantly based on a variety of criteria, such as the type of funds received (e.g., cash payment, credit (e.g., return premium, negative charge), etc.), the information received along with a fund (which may be limited), the state of an insurance policy (e.g., cancelled, delinquent, etc.), the attributes of receivables to be cleared (e.g., the age of the receivable), the relative importance of the eligible receivables, etc. Compounding the issue is that insurance carriers potentially bill high volumes of invoices, which result in the collection and processing of a corresponding high volume of payments. Given the high volumes of sent invoices and collected payments, allocation of funds for clearing of receivables (in which the manner in which funds are allocated may depend on a variety of factors) in a timely manner can be challenging. Configuring how funds should be allocated can be difficult as well, as rules and heuristics for satisfying the various scenarios and conditions that may arise can be complex.

As one example, suppose that a new customer of an insurance carrier purchases an auto policy at the beginning of the year on January $1^{st}$ to provide insurance coverage for two cars. In this example, the total policy is worth $1200/year, with $600 due for each automobile.

In this example, the amount due for the policy is spread equally across a monthly installment plan/schedule. Each month, an invoice of $100 ($50 for each car) is sent to the policy holder, where the monthly installment is a receivable for which payment is due.

Suppose that on January $18^{th}$, before the due date of the payment for the installment, the insurance carrier receives a check from the policy holder. In this example, the memo of the check includes information indicating that the payment is to be directed to clearing the $100 installment for the month of January. Based on the information, receivables associated with the January installment are identified by the insurance carrier, and the payment is applied specifically to the January installment.

In the above example, information was received with the payment that allowed a specific set of receivables (those associated with the January installment) to be identified to be cleared. In some cases, a payment may be received by the insurance carrier that includes limited information regarding allocation of the payment. For example, suppose that the policy holder of the auto policy has multiple other policies under their insurance account (e.g., a home policy, an auto policy, a maritime policy, etc.), but the check for $100 that is received does not indicate the target of the payment. As will be described in more detail below, using the techniques described herein, a plan for how funds should be allocated can be pre-configured and used to automatically determine the receivables that are eligible be cleared, the order in which they are cleared, and how the received payment should be applied given the information received.

As another example scenario exemplifying the challenges in managing the allocation of funds, the application of funds can be dependent on the type of funds to be processed/allocated as well.

Suppose that the holder of the auto policy is selling a vehicle and calls the insurance carrier have the vehicle removed from their auto policy (i.e., the policy holder no longer wishes to have insurance coverage for one of their automobiles).

As the vehicle is to be removed, the future months of installments that were pre-established/pre-planned according to the installment schedule should also be removed/cleared/closed out, such that the policy holder will no longer be billed for insurance coverage for the cancelled vehicle (i.e., the monthly installment receivables were established at the time of the creation of the policy, and the pre-established/pre-planned future installments pertaining to the cancelled vehicle must therefore be cancelled out). In the example above, the $1200 auto policy was split equally among the two cars, such that the amount due was $600 for each car for the year. With equal amounts due for each installment, the installment for each car each month is $50/month. In this example, suppose that the policy holder cancels coverage after the first month. Thus, in order to remove the 11 months of installments remaining for the removed vehicle on the policy, a credit (which is a type of fund) of $550 ($50×11 months) should be applied to the remaining schedule installments.

When the $550 credit is received, it is applied in such a manner that it is broken down to clear each of the remaining 11 months of planned installments. By doing so, the policy holder is prevented from receiving future invoices for the vehicle. Thus, the total amount of payment that can be collected for the original $1200 policy should now be $650, and invoices for the last months of coverage for the cancelled vehicle should not be sent to the policy holder.

In the example above, receipt of a cancellation credit should result in installments being cleared from furthest out (in time) to most current. For different types of credits, the allocation of funds may be required to be performed differently. For example, suppose that for a personal auto policy with a single vehicle being covered, the amount of collision coverage is to be reduced. As the collision coverage is reduced, the amount due from the policy holder should be reduced as well. Thus, in response to the reduction in coverage, a credit may be issued. Rather than removing installments as in the cancellation, the credit can be applied proportionally across all remaining planned installments, to lower the policy holder's monthly installments.

As shown in the examples above, what receivables should be cleared and how those receivables should be cleared can depend on a variety of factors/conditions that can vary significantly depending on the context/scenario in which a fund is received. Thus, configuring the rules and heuristics to manage funds allocation under such varied conditions can be challenging, which can be compounded when handling a high volume of funds processing requests.

Thus, managing allocation of funds can be complex, and configuring rules to cover a broad/complex range of scenarios that consider a large number of potential criteria and conditions can be challenging for users such as billing agents, who are tasked with configuring the rules and heuristics that govern how funds are to be allocated.

Typically, the configuration of rules/heuristics for allocation of funds is a resource-intensive and complex process that may require specialized backend coding of the rules by IT personnel. In order to facilitate efficient configuration of rules and allocation plans, described herein are techniques for providing a user interface (UI)-based tool/wizard for configuring funds allocation plans, which are used to automatically perform funds reconciliation. In some embodiments, funds allocation plans include payment allocation plans for applying payment type (e.g., cash payment) funds. In some embodiments, funds allocation plans include return premium plans for applying credits such as return premium credits. Furthermore, described herein are techniques for allowing users to express the configuration/allocation rules in a manner that allows users to express and articulate allocation rules of arbitrary complexity along various dimensions without requiring extensive programming knowledge. As will be described in further detail below, filters and comparators, which can be implemented by a backend IT programmer, once coded, are expressed/visually represented in a user interface-based tool that allows a user to manipulate the various different types of filters and comparators to construct a funds allocation plan. Using the UI-based tool, the user can specify how to determine, for a given received fund and any other provided fund information, a set of receivables to which the funds should be allocated and the priority in which the receivables should be cleared.

As one example, using the user interface (UI)-based tool, a user can specify various rules and heuristics for expressing that collision coverage is more important than comprehensive, and that in a particular scenario, a first-in, first-out application of funds is applicable. As another example, although a bill may have been sent that covers multiple policies, a received payment may specify that the payment is to be directed towards a single policy (e.g., a check is received with a memo indicating a particular policy number). The payment, while covering the receivables due for the indicated policy, may result in excess funds. Using the UI-based tool, a user can specify in a funds allocation plan how excess funds should be handled/allocated. As another example, the user can use the UI-based tool to define how funds allocation should operate under other conditions, such as if the state of the policy under consideration is cancelled or under delinquency. Rules can be defined such that if a payment comes in directed to a policy in such a state, the received payment should be held until the policy is reinstated and new charges are created. Using a simple UI-based tool as described below, users can easily configure rules for defining funds allocation plans that can handle a variety of scenarios and situations.

Environment

Figure 2:
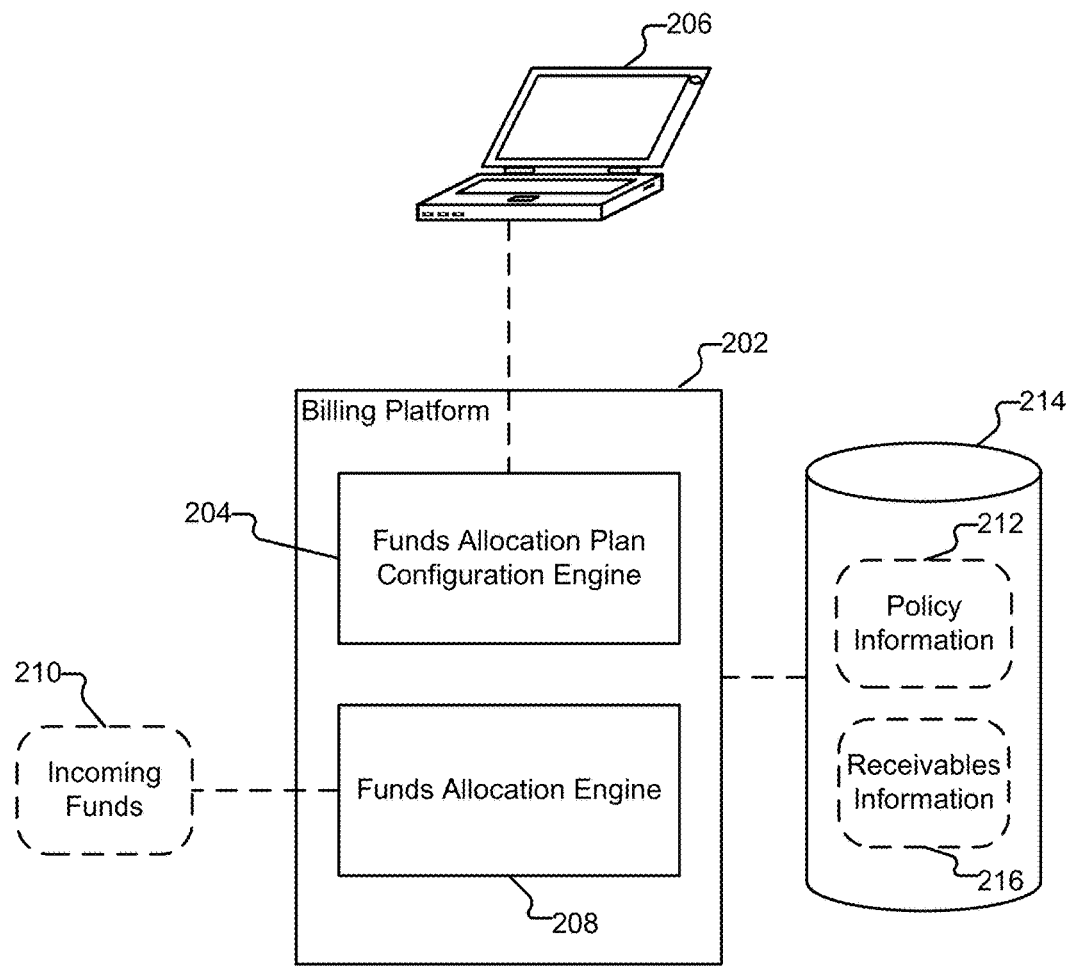
FIG. 2 illustrates an embodiment of an environment in which configuring of funds allocation plans and allocation of funds is performed.

FIG. 2 illustrates an embodiment of an environment in which configuring of funds allocation plans and allocation of funds is performed. In this example, Alice is a billing clerk working for an insurance carrier. Alice is tasked with configuring funds allocation plans, which include rules and heuristics for determining how funds are to be allocated and receivables are to be cleared. In this example, suppose that Alice is configuring a funds allocation plan that is to be assigned to auto insurance policies. As will be described in more detail below, the rules/heuristics of the funds allocation plan are defined/expressed using a set of filters and comparators, where the filters are used to identify an eligible set of receivables to be cleared, and the comparators are used to prioritize/rank the eligible receivables to determine the order in which the eligible receivables will be cleared.

In this example, billing platform 202 provides an infrastructure for configuring funds allocation rules and heuristics to be used in applying funds to receivables.

In this example, the billing platform includes funds allocation plan configuration engine 204, which is configured to provide a user interface (UI)-based tool that exposes a set of preconfigured filters and comparators (e.g., visual/display representations of previously configured filters and comparators) which a user can utilize to create a funds allocation plan. As described above, the funds allocation plan specifies rules/heuristics for determining the eligible receivables that are qualified to be paid by a received fund (e.g., by using filters), as well as the priority in which the eligible receivables are to be cleared (e.g., by using comparators). In some embodiments, the UI-based tool provided by the funds allocation plan configuration engine is accessible via a client device such as client device 206, which is a computing device used by Alice. The UI-based tool can be an application that is implemented as a browser-based application (e.g., accessible via a network such as the Internet, a wide area network, a local area network, or any other appropriate network) or a standalone application executing on the client device.

In this example, via the UI-based tool, Alice can express rules/heuristics by selecting different types of preconfigured filters and comparators. In some embodiments, the selection is made from a pool of preconfigured candidate filters and comparators, which are represented via the user interface, for example, via labels (or any other appropriate visual/display representations). In some embodiments, the labels indicate the criteria upon which the filters and comparators operate. Thus, by specifying a combination of filters, Alice can define how an eligible set of receivables can be determined/arrived at (e.g., from a larger initial set of receivables). Similarly, by selecting and ordering a set of comparators, Alice can define how eligible receivables are to be ranked, which will be used to determine the priority in which the eligible receivables are cleared. In some embodiments, Alice can also specify rules and conditions for when rulesets, filters, and comparators should be applied. For example, one particular ruleset may only be applied if the fund received is a cash payment, while another ruleset may be applied if the fund received is a credit. Additionally, some filters/comparators may be ignored/prioritized if certain conditions are met/not met. By providing users with filters and comparators, users can be given control to define funds allocation plans that are applicable for applying funds under a variety of conditions.

In this example, the candidate filters and comparators, while represented using labels in the interface (or any other appropriate type of visual/display representation), correspond to portions of backend code that are implemented, for example, by an IT user or developer (or provided by default). By being able to define rules by manipulating visual/display representations of filters and comparators via a user interface, Alice can configure a funds allocation plan without being required to implement/write code. For example, when selecting filters to determine eligible/qualified receivables, Alice can simply drag and group together a set of filter labels. When selecting comparators, Alice can group together the labels for the comparators and sort them by arranging them vertically within the UI, where the vertical placement of the comparators indicates the priority of the comparator criteria.

As will be described in more detail below, using the interface, Alice can configure different types of funds allocation plan that can be assigned to different types of insurance policies/accounts. For example, Alice can configure a funds allocation plan that is to be used in allocating credits for personal auto policies. As another example, Alice can configure a funds allocation plan that is to be used in allocating cash payments to commercial policies. Once a funds allocation plan is completed, in some embodiments, it is automatically assigned to various types of insurance policies/accounts, for example, at the time that the policy is created.

The billing platform also includes funds allocation engine 208, which is configured to allocate received funds, for example, based on a funds allocation plan, such as one configured by a user via the funds allocation plan configuration engine as described above. In this example, an incoming fund (210) is received by the billing platform. The incoming fund is processed by the funds allocation engine, which determines, for example, the type of the received fund (e.g., credit, cash payment, etc.), and any accompanying fund information (e.g., policy number indicated on a check if available, endorsement information associated with a credit, invoice number, payment coupon, etc.). Based on the fund information, the fund allocation engine is configured to determine an appropriate fund allocation plan to use to determine how the incoming funds are to be applied. For example, if the incoming funds is a check that includes the corresponding policy number in the memo of the check, then the policy with the policy number can be retrieved (e.g., from policy information 212 stored in data store 214). The funds allocation engine can then obtain the funds allocation plan that is assigned to the insurance policy/account. Using the rules/heuristics defined in the funds allocation plan (specified by the filters and comparators), various factors such as the type of funds received, the funds information that was received, attributes of stored receivables (e.g., obtained from receivables information 216), etc. can be used to determine the set of receivables that are eligible to be cleared, and the priority in which the eligible receivables are to be cleared. More details of the fund allocation engine are described below.

Billing Platform

Figure 3:
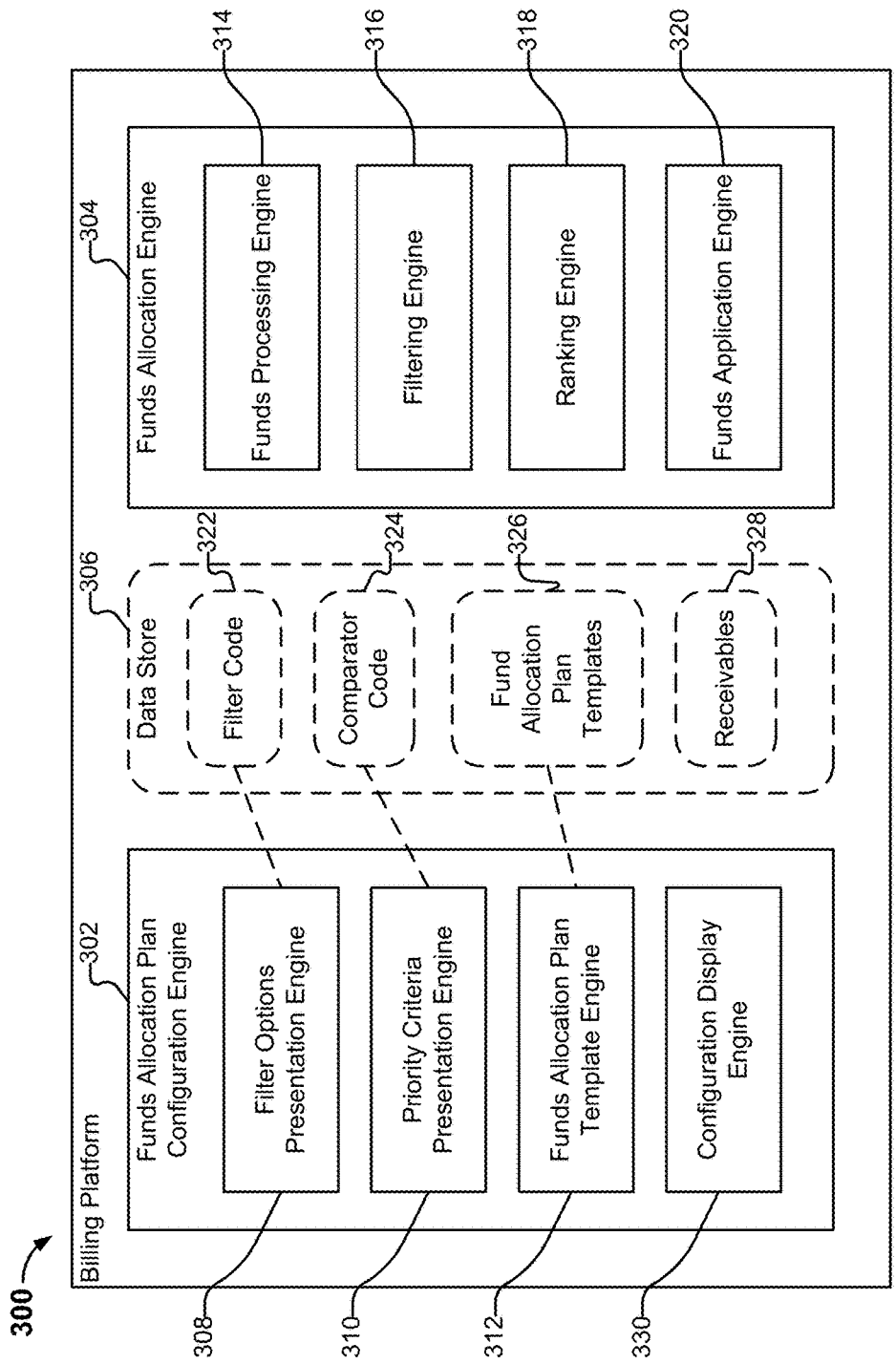
FIG. 3 illustrates an embodiment of a billing management platform.

FIG. 3 illustrates an embodiment of a billing management platform. In some embodiments, billing management platform 300 is an example of billing management platform 202 of FIG. 2, which can be implemented using one or more systems 100 of FIG. 1. In some embodiments, the billing platform is configured to allow for the configuration of funds allocation plans, which are used to determine the allocation of funds to receivables. In the example shown, platform 300 includes funds allocation plan configuration engine 302, funds allocation engine 304, and data store 306. Funds allocation plan configuration engine 302 further includes filter options presentation engine 308, priority criteria presentation engine 310, funds allocation plan template engine 312, and configuration display engine 330. Funds allocation engine 304 further includes funds processing engine 314, filtering engine 316, ranking/prioritization engine 318, and funds application engine 320.

In some embodiments, funds allocation plan configuration engine 302 is configured to allow user configuration of funds allocation plans. As described above, in some embodiments, a funds allocation plan comprises an encapsulation of rules/heuristics that are used to govern how funds are allocated. The rules and heuristics are used to determine, for a received fund, what receivables are to be cleared, and how those receivables are to be cleared. As described above, funds processing/reconciliation can be based on a variety of factors, such as the type of funds received, information received with a fund, attributes of receivables, etc.

In some embodiments, the funds allocation plan configuration engine is configured to provide a user interface (UI)-based tool/wizard to allow for the configuration and specification of funds allocation plans. Example interfaces for configuring funds allocation plans are shown below in conjunction with FIGS. 6-10. As will be described in more detail below, the rules for determining what receivables are eligible to be cleared can be expressed via a selection of one or more filters. In some embodiments, the rules/heuristics for prioritizing the eligible receivables are expressed via a sorted selection of comparators. In some embodiments, a user interacts with the UI-based tool to select and configure the filters and comparators they desire to define the ruleset for the funds allocation plan. As will be described in more detail below, a funds allocation plan can be associated with multiple rulesets, with a ruleset to be applied when allocating funds determined based on a higher level set of criteria/conditions/provisions.

In some embodiments, a filter, when executed/applied, filters a set of receivables/invoice items according to a particular filtering criteria or set of conditions. The criteria/conditions comprise dimensions along which receivables are evaluated and filtered. In some embodiments, each filter that is available to be selected is programmed to filter/refine receivables based on a different dimension. For example, different filters can be used to filter receivables according to different receivable attributes. One filter can be programmed/configured to filter receivables/invoice items based on the policy number attribute of receivables, while another filter can be programmed to filter receivables based on the charge pattern attribute (e.g., a combination of a type of a charge and the insurance element it is associated with, such as premium for coverage, tax for liability coverage, etc.). In some embodiments, a filter is configured to determine the attribute of a receivable and return an output (e.g., true or false) indicating whether the receivable should be included or excluded in the eligible set of receivables.

Other criteria can be used to filter receivables. For example, in some embodiments, the criterion for a filter is based on external information, such as received fund information. For example, a check may include a memo indicating the insurance policy against which the check should be allocated. The fund information can be used as a first filter criterion for determining the receivables that are eligible (e.g., by filtering a universal set of receivables to filter out those receivables that are not associated with the indicated policy number). In this example, receivables were filtered based on whether they were associated with a policy number that matched the policy number targeted by the received payment.

If the user has multiple criteria for defining an eligible set of receivables, the user can specify multiple, corresponding filters to be applied in combination. The set of filters can be applied to an initial set of receivables, with the initial set further refined according to the criteria of each filter until all of the filters have been applied. The resulting subset of receivables (e.g., corresponding to the intersection of the filter criteria) are the eligible set of receivables to which funds are to be allocated. In some embodiments, one or more filters are used to exclude receivables in a set from being eligible/qualified to be cleared. In some embodiments, a filter is associated with a condition, in which the filter is only applied if the corresponding condition is met. An example in which a delinquency provision condition is configured to handle delinquent policies will be described in more detail below.

In some embodiments, filters include sub-options that apply under certain sub-conditions. For example, a filter can be configured to filter receivables according to a given type of control/dimension, while sub-choices under the given dimension are grouped under the filter. The sub-choices allow for a filter to be further refined. In some embodiments, the further refinement of a filter is expressed as different filters. As an example, suppose that a filter is configured to filter receivables based on the billed status attribute of receivables. While the filter is to be applied according to the billed status attribute/dimension, the filter can be further refined to control what occurs for particular types of billed status. For example, the billed status of a receivable can be either past due, billed, or planned. Each of the types of billed status can be used as sub-options to further refine how receivables are filtered.

In some embodiments, while filters can be configured to narrow down/refine an initial set of receivables into an eligible set of receivables based on a set of criteria, provisions can be added/configured that expand the set of eligible receivables. One example of a provision is a delinquency provision for handling delinquent policies. A delinquency provision can be added such that, for example, any delinquent charges associated with the delinquent policy are added to the set of eligible receivables, irrespective of whether those delinquent charges would have been included in the eligible set based on configured filtering criteria. Thus, the delinquent charges can be funded. An example of a delinquency provision will be described in further detail below. Provisions for other types of dimensions that can be applied in addition to filtering criteria when determining an allocation set can also be implemented.

In some embodiments, filter options presentation engine 308 is configured to support the configuration of filters via a UI-based tool. In some embodiments, each filter is implemented as backend programming code (e.g., stored in filter code 322 of data store 306, as will be described in more detail below). Filter code, when executed, filters a receivable (e.g., includes or excludes) according to a set of conditions/criteria.

As described, in some embodiments, each filter is associated with a corresponding label, and the filter options presentation engine is configured to represent the filters in the UI-based tool/wizard using their corresponding labels. The labels, which are graphically presented in the UI, can be interacted with/manipulated via the UI. Thus, when the user specifies filtering rules, the user can select a set of appropriate filters from a pool of candidate available filters. As the user interacts with label representations of the filters in the user interface, the user can construct complex filtering rules based on multiple criteria without having to write programming code.

As described above, in some embodiments, a user specifies the order in which eligible receivables are to be applied by selecting a sorting of a set of comparators. The sorted selection of comparators comprise priority criteria used to rank the priority of the eligible/qualified receivables. In some embodiments, the comparators correspond to various different criteria/dimensions upon which priority decisions are made.

In some embodiments, a comparator is configured to determine, given two receivables, whether the first receivable is less important, more important, or of equal importance to the second receivable, based on a criteria/condition/dimension. Example criteria that can be configured for determining relative importance/ranking/priority include attributes of receivables, such as their charge pattern, charge priority, bill date, due date, etc. Funds are applied in the order of importance of the receivables. For example, receivables of one charge pattern, such as coverage premium, can be specified as being more important than receivables of another charge pattern, such as liability coverage tax, with coverage premiums being funded before liability coverage taxes.

In some embodiments, a given comparator criteria may include multiple options. For example, suppose that a comparator is associated with the charge group criteria. There may be several types of charge groups, such as premiums, taxes, fees, etc. The different types of charge groups correspond to the charge group attributes of receivables. A user can configure the comparator to indicate the relative importance among the different types of charge groups. For example, the individual types of charge groups can be sorted by a user, such that taxes are indicated as being more important than premiums, while premiums are more important than fees. In some embodiments, the priorities of the types/options for a category of criteria are specified by assigning a pre-set weight/priority. For example, the most important type can be assigned a weight/priority of 10, while the next important is assigned a priority of 20, where lower weight/priority values indicate higher importance (other prioritization schemes can be used as well, for example, where higher values indicate higher importance). Types of options for criteria that are assigned equal weights/priority are of equal importance.

In some embodiments, the criteria used by a comparator to compare receivables is based on information associated with a received fund. For example, fund information may indicate an intended target for the fund, such as a particular invoice, a particular policy, a particular type of coverage, etc. which can be used as a prioritization criteria. Suppose, for example, a comparator is configured to compare receivables based on whether the receivable has a coverage that matches a policy coverage that is targeted in fund information. If the coverage of the receivable matches the target coverage, then the receivable is determined to have a higher priority as compared to those receivables that are not associated with a matching coverage. As another example, a comparator can be selected that is configured to prioritize receivables that have a policy term matching the targeted policy term over receivables that do not have a matching policy term.

As another example of configuring comparators to handle prioritization under different scenarios, suppose that a funds allocation plan to be assigned to personal auto policies is to be configured. As auto insurance coverage is mandatory, and driving without auto insurance is illegal, a user can specify, using comparators, that receivables related to liability are more important than collision, and thus clearing of invoices related to liability installments should be prioritized over those installments related to collision coverage. As another example, the user can indicate that charges associated with a collision coverage charge pattern are more important than charges with a comprehensive coverage charge pattern, and that charges are to be cleared in a first-in, first-out (FIFO) order (e.g., closest to furthest by time).

As another example of configuring comparators, past due and billed items can be specified to be handled differently than future items. For example, among past due and billed invoice items, charge pattern can be specified to have a higher priority than the date that an item was billed, whereas among planned items, billed date can be configured to be higher priority than charge pattern priority. Such an example configuration would allow, for example, an insurance carrier to collect a mandatory coverage such as liability coverage before an optional coverage such as collision coverage among past due and billed items, whereas with planned items, the carrier would settle the first unbilled invoice (earlier bill date) completely before subsequent invoices.

In some embodiments, the relative importance of ranking criteria is performed by ranking and sorting the corresponding comparators, which in some embodiments, indicates the order in which comparators are to be applied. For example, the user can indicate that the comparator for evaluating receivables according to the charge pattern criteria takes priority over the comparator for evaluating receivables according to the charge group criteria, and thus the charge pattern criteria comparator should be applied first to the set of eligible receivables, before the charge group comparator.

In some embodiments, a comparator includes a set of conditions which is used to determine whether the comparator should be applied at allocation time. If the set of conditions is not met, then the comparator is not applied, and the next comparator in the sequence is considered. For example, suppose that a first comparator is to be applied if the indicated target of a fund is a particular policy period. A second comparator is prioritized directly below the first comparator (i.e., lower priority than the first comparator) and is to be applied if the indicated target of the fund is a specific invoice. Suppose for example that a fund is received where the indicated target is an invoice number. When processing the comparators, the first comparator will be evaluated first. As the indicated target of the received fund is not a policy period, the first comparator is not applied. The second comparator, which is next in the sorted order of comparators is then evaluated to determine that the condition to apply the second comparator has been met.

The comparators can be organized in a manner that prioritizes receivables with a particular combination of attributes/criteria. For example, a comparator can be selected by a user that indicates that liability type charges are the highest priority type of charge. Another comparator can be selected by the user to indicate that past due charges are of the highest priority with respect to the state of a receivable. With this combination of comparators established in the funds allocation plan, past due liability charges will be prioritized ahead of any other types of charges that may be in other states.

As will be described in more detail below, at runtime, the sorted selection of priority criteria is used at least in part to generate a decision tree that is used to compartmentalize a set of input receivables (e.g., the determined eligible receivables resulting from the filtering described above) into a set of ranked partitions. One example of a decision tree is a binary decision tree. As will be described in more detail below, the leaves of the binary decision tree are ranked partitions into which the eligible set of receivables are to be compartmentalized. The nodes of the tree, at which decisions are made regarding which branch of the tree a receivable will traverse (e.g., left branch for higher priority items or right branch for lower priority items), are based on the selected comparators. In some embodiments, the structure of the tree is generated according to the ordering (sorting) of the comparators.

In some embodiments, priority criteria presentation engine 310 is configured to support the configuration of priority criteria in a funds allocation plan. As described above, in some embodiments, the comparators are implemented as backend programming code (e.g., stored in comparator code 324 of data store 306), where each comparator has a corresponding label. Similar to the presentation of filters, in some embodiments, the priority criteria presentation engine is configured to present the comparators in the UI-based tool/wizard using their respective labels. The labels can be interacted with by a user, such that the user can select comparators of interest (e.g., from a candidate pool of available comparators) and sort them via the UI. As with filters, as the user interacts with label representations of the comparators in the user interface, the user can construct complex prioritization rules based on multiple criteria without having to write programming code.

As one example of selecting and sorting comparators via their representations, a user, via a user interface, can manipulate selected comparators and place one comparator above another comparator (i.e., vertical arrangement) to indicate that the higher comparator is of more importance than the lower comparator (and that the higher comparator should be considered ahead of the lower-placed comparator). Other orientations/schemes for specifying sort order among comparators (e.g., horizontal, left to right priority) can be specified/configured.

In some embodiments, upon selection/configuration of filters and comparators for a funds allocation plan, the configured funds allocation plan is stored as a template (e.g., to fund allocation plan templates 326 of data store 306) using funds allocation plan template engine 312. In some embodiments, configuring a funds allocation plan template includes specifying the type(s) of policies/accounts to which the funds allocation plan template should be assigned. For example, a user such as Alice can create a funds allocation plan template to be assigned to personal auto insurance policies, a separate funds allocation plan to be assigned to commercial insurance policies, etc. Thus, when a new insurance policy is created, a particular type of funds allocation plan can be assigned to the new policy (either automatically or manually). By allowing for the configuration of different funds allocation plan templates, different options/packages/combinations of rules/heuristics can be assigned to different insurance policies/accounts.

In some embodiments, insurance policies/accounts can be assigned multiple funds allocation plans/rule sets, each defining different filtering options and prioritization criteria. In some embodiments, the determination of which funds allocation plan to apply is based on a set of higher level criteria/conditions. For example, funds allocation plans can be configured by a user to be applied based on the type of funds received. For example, for a given policy, a payment allocation plan can be used to handle cash payments, while a return premium allocation plan can be used if a return premium endorsement is received. Examples of different allocation plans that are configured for handling different types of received funds will be described in more detail below.

In some embodiments, configuration display engine 330 is configured to provide a user interface-based tool/wizard for configuring funds allocation plans. For example, via presented user interfaces, user configurations of filtering and priority criteria can be received from users. As described above, the configuration can be performed by users by interacting with displayed representations of filters and comparators (e.g., by using corresponding labels). In some embodiments, the configuration display engine communicates with other engines such as filter options presentation engine 308 and priority criteria presentation engine 310 in order to provide users options for configuring filters and comparators. In some embodiments, the filters and comparators that are available to be selected from by a user via the UI are implemented as code (e.g., GOSU code) in a backend data store (e.g., data store 306). In this example, filter code store 322 includes code for various filters and comparator code store 324 includes code for various comparators. As described above, each filter and comparator in the backend data store is represented/exposed in the UI to be interacted with by a user (e.g., via a label). In some embodiments, the framework for establishing filters and comparators is modifiable and extensible, such that existing filters and comparators can be modified and deleted, and new filters and comparators added. In some embodiments, a separate interface is provided for programmers/developers to create new filters, modify existing filters, etc. (e.g., by using the GOSU programming language).

In some embodiments, when creating code for a new filter, the new filter as well as a description for the type key is created. In some embodiments, the new filter is added to a type list. In some embodiments, the type list includes a list of each of the types of filters that are available to be executed. In some embodiments, the type list is extensible, such that a user can add further entries to the type list (e.g., new classes of filters) that are associated with the program code for the corresponding filters. In some embodiments, the filter programming code and type list are maintained in filter code 322 of data store 306. In some embodiments, the filters include default filters.

In some embodiments, changes made to the backend filter and comparator data stores are reflected/exposed in the user interface-based tool/wizard. Thus, a separation between users of the tool such as Alice and users such as IT developers can be maintained, such that Alice can utilize the functionality of filters and comparators (e.g., by interacting with UI representations of filters and comparators) without having to write program code.

In some embodiments, when a funds allocation plan is applied, the code for the filters and comparators is obtained and executed to process a received fund.

As described above, funds allocation plans are configured to determine what receivables are to be cleared and the order in which they are to be cleared. In some embodiments, receivables managed by the billing platform (e.g., receivables 328 of data store 306) are associated with attributes, including billing status (e.g., paid, unpaid, past due, planned), charge pattern (e.g., a combination of charge type and the insurance element it is associated with, such as premium for coverage, tax for liability coverage, etc.), charge group (a free form identifier that could be used to denote the type of coverage, a premium audit number, a bordereaux number, or any combination of such information), etc. In some embodiments, the billing platform is configured to monitor/process receivables at the level/granularity of invoice items, such as installments and downpayments, which may be sub-units/portions/slices of receivables. In some embodiments, invoice items are the smallest granularity/unit of receivable that is maintained by the billing platform.

As described in the previous examples, in some embodiments, receivables include attributes associated with bill dates and due dates. In some embodiments, the billing date can be used by the billing platform to perform batch invoicing of receivables (e.g., send out all invoices that have the same bill date).

In some embodiments, for each installment, the billing platform tracks the remaining amount due for the installment, the age of the receivable (e.g., the time elapsed since the installment was billed, the amount of time past due), etc. For some types of installments, the status of installment is also maintained. Certain attributes of installments, such as the installment status may be required to be reported (e.g., to authorities). The attributes such as past due date can also be used for accounting purposes. For example, if a receivable becomes older than a threshold number of days without being cleared (e.g., the receivable has become stale due to remaining unpaid beyond a threshold amount of time), then the receivable may become an inadmissible asset (as receivables are considered assets, they are only admissible as applying to reserves so long as they are current).

In some embodiments, the funds allocation engine is configured to perform the allocation of funds to receivables. In some embodiments, the funds allocation engine is configured to perform the allocation of funds according to funds allocation plans such as those configured using the funds allocation plan configuration engine described above.

In some embodiments, funds processing engine 314 is configured to process the received fund and any accompanying fund information. In some embodiments, the processing includes determining identification information included in the fund information, which may indicate a target of the received fund. This can include evaluating the fund to determine whether an associated/corresponding insurance policy and/or account can be determined given information included with a fund. For example, a check may include a policy number, which is identified by the funds processing engine. As another example, data associated with a payment may include an invoice number. Different types of fund information may have different prefixes or other indicators (e.g., policy numbers start with "P," and invoice numbers start with "I"), which can be used to identify their types. As will be described in more detail below, the fund information can be used as filtering information to determine an initial set of receivables.

In some embodiments, contextual information can be used to identify a relevant insurance policy/account, for example, if a specific policy/account is not explicitly specified. For example, insurance carriers can use information previously recorded by smart lockboxes to aid in determining information associated with funds. For example, smart lockboxes are configured to record the bank routing number or pin number of a payment and associate the payment/fund information with an insurance account number. Suppose, for example, that a previously received check was processed using a smart lockbox, and the routing number for the check has already been recorded to be associated with a particular insurance account/policy number. If a subsequent check is received that does not indicate the account to which the payment is to be directed, the previously recorded information can be used to match the routing number of the check to the appropriate insurance policy/account number.

In some embodiments, the processing performed by the funds processing engine is used to determine an appropriate funds allocation plan to apply in order to guide the funds allocation workflow. For example, by determining an insurance policy/account from a received fund (and any accompanying fund information) as described above, the funds allocation plan assigned to the identified insurance policy/account can then be obtained. In some embodiments, the funds processing engine is configured to determine the type of funds received. For example, different funds allocation plans may have been configured that are to be applied based on various conditions, such as the type of funds received. For example, as will be described in more detail below, different allocation plans for handling cash payments and credits can be configured.

In some embodiments, filtering engine 316 is configured to filter a set of candidate receivables to determine a subset of eligible receivables that are qualified to be cleared by a received fund. In some embodiments, the filtering is performed based on the selection/configuration of filters specified in a funds allocation plan. In some embodiments, receivables are filtered based on a variety of factors, such as the type of funds received, received funds information, attributes of the receivables, etc.

In some embodiments, an initial set of receivables is determined based on filtering information included in received fund information. For example, if an insurance policy was indicated with a fund, the insurance policy number can be used as an initial filter to obtain (e.g., from receivables 328 of data store 306) the set of receivables/charges associated with the policy number (from the set of all receivables). The obtained initial group of receivables will then be processed according to the filtering criteria specified in an obtained funds allocation plan. As another example, if a credit is received, for example, from a policy system, then, in some embodiments, the received credit already is associated with instructions for the receivables to which the credit should be applied, and the eligible set of receivables is obtained according to the instructions.

As described above, the filters specified in the funds allocation plan are used to refine a set of candidate receivables down to a set of eligible/qualified receivables. Each filter specifies a criterion on which an item is determined to be eligible or ineligible. Thus, all items that satisfy all of the criteria of the various filters of the plan (i.e., intersection of the criteria specified by the filter) are determined as eligible receivables.

As described above, filters can be based on any appropriate criteria. Example criteria include criteria associated with attributes/status of a policy (e.g., whether the policy is delinquent, whether the policy is cancelled, whether the policy has been reinstated, etc.). Other example criteria include attributes of the receivables being filtered (e.g., whether the receivable has a particular charge pattern, whether the receivable has a particular charge priority, etc.).

In some embodiments, if multiple filters are specified, the intersected set of receivables defined by the filters is the eligible set of receivables. In some embodiments, as will be described in more detail below, provisions can be specified to expand the allocation set of receivables based on certain conditions being met (e.g., if a targeted policy is delinquent). In some embodiments, the code for the filters is obtained from a backend (e.g., filter code 322) and executed, to perform filtering.

In some embodiments, ranking engine 318 is configured to prioritize the filtered set of receivables received from the filtering engine. In some embodiments, the determined set of eligible receivables is ranked according to the priority criteria specified using the sorted selection of comparators in the funds allocation plan.

As described above, the comparators can be used to specify the relative ranking of receivables. The receivables can be ranked according to various dimensions (e.g., by time, type of charge, etc.) which can be determined, for example, by evaluating corresponding attributes of receivables. For example, comparators can be configured to compare receivables based on the attribute of charge pattern, based on bill date, based on due date, the age of the receivable, etc. The filtered items are prioritized by processing the eligible items through the comparators. In some embodiments, comparator code is obtained from a backend data store such as comparator code 324 and executed.

In some embodiments, the ranking engine is configured to use the sorted selection of comparators to construct a decision graph that is used to prioritize/rank the filtered set of receivables. One example of a decision graph is a binary decision tree. In some embodiments, receivables are passed through the binary decision tree, until they ultimately land within a particular leaf node of the binary decision tree. In some embodiments, leaf nodes are buckets/partitions into which receivables are compartmentalized.

In some embodiments, the priority of a receivable is based on the leaf node partition in which the receivable lands. For example, in a binary decision tree, each node (except for the leaf nodes) is a decision point in the graph. The decision of whether a receivable should progress down the left branch or right branch of the decision node depends on the comparator corresponding to the node. For example, in some embodiments, receivables determined to be more important based on the criteria of the comparator are caused to proceed down left branches, while less important receivables are caused to proceed down right branches. Thus, in this example, the leftmost leaf node in the binary decision tree is the partition representative of the highest priority of all leaf node partitions, while the right most leaf node is the lowest priority partition. In some embodiments, receivables within the same leaf node are of equal priority.

In some embodiments, the structure of the tree and how it is generated is based on the set of comparators and how they are sorted. For example, in some embodiments, the root of the tree (i.e., first sorting criteria) is dependent on the comparator criteria that the user has indicated as having highest priority in the configuration UI. Thus, for example, whatever is listed as the highest priority in the configuration UI is translated into the top branch of the decision tree. For example, if a user wishes to specify that past due billed receivables are more important than charge pattern, such that all past due receivables should be prioritized to be paid first before other charges such as premiums, liabilities, etc., the user simply has to place, in the UI, the past due criteria as higher than the charge pattern criteria. The decision tree will then be constructed accordingly, with the past due billed criteria being the top branch.

In some embodiments, while the sorted selection of comparators/priority criteria comprise static rules for indicating how a tree is to be built, building the decision tree is based on information received at runtime, such as received fund information. While the sorted selection of comparators may be used to cover a wide range of conditions, it may be at runtime that only some of those conditions are met, and only certain portions of the tree are required to be built.

For example, suppose that the priority criteria in the funds allocation plan have been configured such that a targeted policy period is of the highest priority. The next most important criteria/allocation priority rule is the targeted invoice. Suppose that a payment check is received that is paying a particular invoice. As the invoice has been targeted, the check should be allocated to the receivables associated with the invoice. Thus, the second priority rule associated with the targeted policy, given the contextual information at runtime (e.g., fund information), is now the top level rule on which to prioritize criteria (and the targeted policy number allocation rule is not applied as it is not relevant). The decision tree is thus built accordingly with the targeted invoice as the highest level criteria, without building portions of a tree that would correspond to an invoice being prioritized. In some embodiments, as described above, conditions associated with comparators are used to determine whether the comparator should be applied. In some embodiments, the conditions are evaluated using information received at runtime. In the above example, when considering the comparator associated with the targeted policy term (which is the first priority criteria to be considered according to the UI selection/sorting), the ranking engine can determine from fund information whether a targeted policy term has been indicated. If not, then the rule is skipped/ignored and not used in generating the decision tree. If the condition is met, then the comparator is applied and used when generating the decision tree.

As another example, suppose that a funds allocation plan has been configured for an insurance account. An insurance account may include multiple policies, such as a personal auto policy, personal home policy, a yacht policy, etc. When configuring the funds allocation plan, an agent such as Alice selects and sorts comparators to cover funds allocation for all the potential policies that may be under the account. However, at runtime, funds information may only reference one particular policy, such as the auto policy. Thus, nodes corresponding to other policies such as the yacht policy need not be considered when building the decision tree. However, if another payment is received referencing the yacht policy, then a different decision tree will be created.

As described above, in some embodiments, comparators are used to determine the relative importance of receivables according to a given attribute/dimension. In some embodiments, the given attribute may have multiple types. For example, a charge pattern attribute has multiple types, such as premium, taxes, fees, etc. As described above, a user can assign the different types of the attribute/dimension with different weights to indicate the relative importance of the type of the attribute. For example, premiums can be given a weight/priority of 10 (indicating highest priority), with taxes and fees both assigned the next highest priority of 20 (indicating that they are of equal priority), while all other types of charge patterns are assigned the same priority of 30. In some embodiments, nodes of the decision tree are constructed according to the assigned weights. For example, in order to implement the charge pattern comparator, a first binary decision node can determine whether a receivable is a premium. If so, then the receivable is of the highest priority with respect to the charge pattern attribute and proceeds down the left fork (to be evaluated by the next allocation rule priority criteria). If the receivable is not of premium charge pattern type, then the receivable proceeds down the right fork, and arrives at another decision node, which determines whether the receivable is of type tax or fee (i.e., further prioritize receivable based on charge pattern). If the receivable is either of the two, then the receivable proceeds down the left fork. If not, then the receivable proceeds down the right fork, to be processed by the next level of comparator.

An example of a decision graph is described below in conjunction with FIG. 11.

As described above, in some embodiments, the decision graph is generated at runtime, for example, to take into account contextual information available at runtime. In some embodiments, the decision tree is not instantiated until a filtered set of eligible receivables is determined. For example, in some embodiments, the eligible set of receivables can be used to further determine what comparators are applicable given the run-time context, which in turn can be used to determine the tree that is ultimately constructed.

In some embodiments, funds application engine 320 is configured to apply the received funds to the determined eligible/qualifying set of receivables according to the determined priority.

For example, using the generated tree, the filtered set of eligible items are compartmentalized into ranked partitions. The received fund is then applied from the highest priority partition to the lowest priority partition (e.g., from the leftmost partition to the rightmost partition). In some embodiments, when the remaining funds are insufficient to completely clear the receivables within a partition, the items within the partition are cleared pro rata (where the amount allocated to each invoice item in the partition is based on the unpaid portion of a given invoice item). In some embodiments, the pro rata application reflects the equal priority of receivables within the same partition.

In some embodiments, billing/receivables management platform 300 is implemented using commercially available server-class hardware (e.g., having a multi-core processor (s), 16 G+ of RAM, gigabit network interface adaptor(s), and hard drive(s)) running a typical server-class operating system (e.g., Linux). Whenever platform 300 is described as performing a task, either a single component or a subset of components or all components of platform 300 may cooperate to perform the task. Similarly, whenever a component of platform 300 is described as performing a task, a sub-component may perform the task and/or the component may perform the task in conjunction with other components.

The engines described above can be implemented as software components executing on one or more general purpose processors, as hardware such as programmable logic devices and/or Application Specific Integrated Circuits designed to perform certain functions or a combination thereof. In some embodiments, the engines can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present application. The engines may be implemented on a single device or distributed across multiple devices. The functions of the engines may be merged into one another or further split into multiple sub-units.

Figure 4:
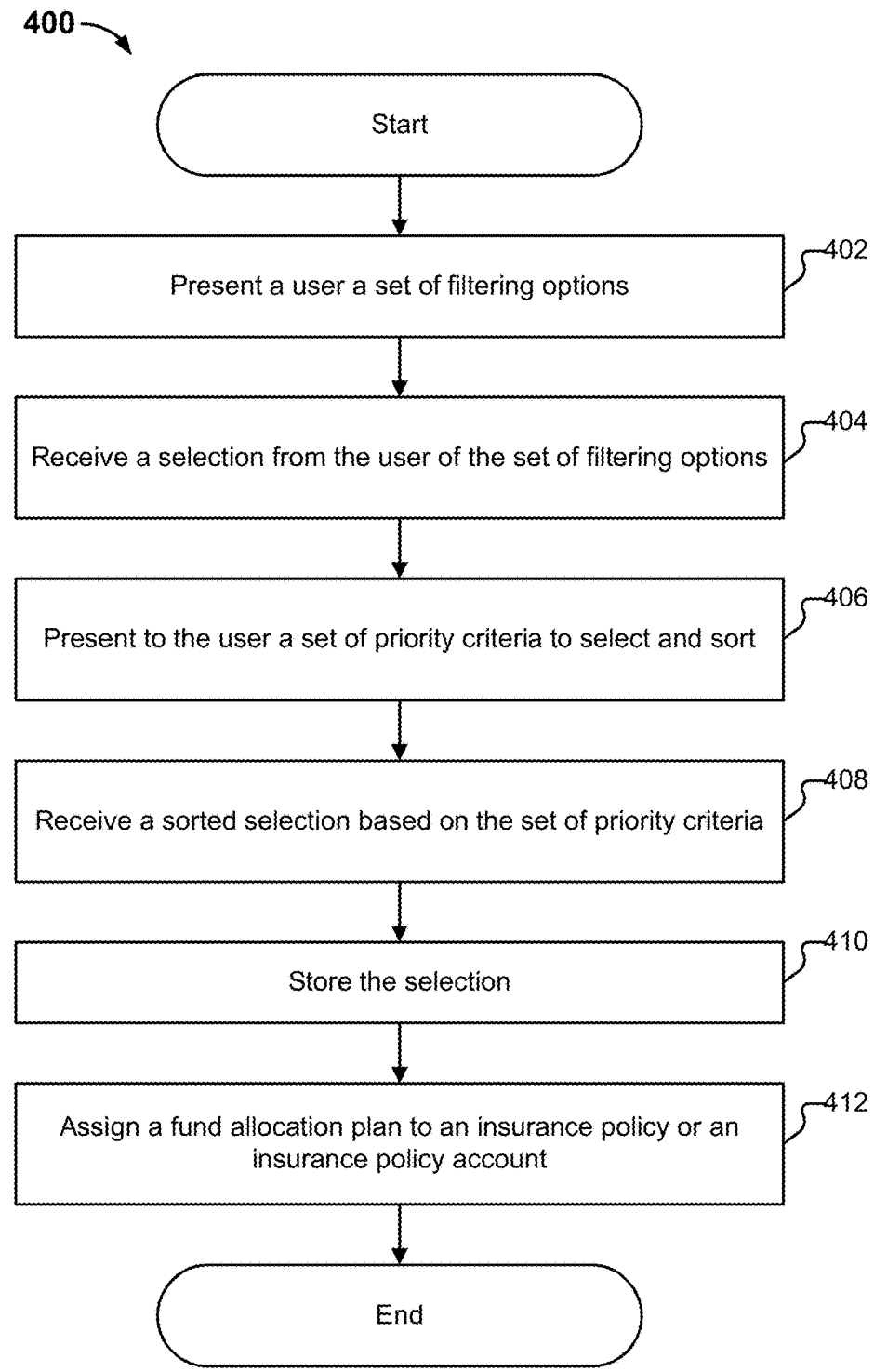
FIG. 4 is a flow diagram illustrating an embodiment of a process for configuring a funds allocation plan.

FIG. 4 is a flow diagram illustrating an embodiment of a process for configuring a funds allocation plan. In some embodiments, process 400 is executed by funds allocation plan configuration engine 302 of FIG. 3. The process begins at 402 when a set of filtering options is presented to a user. In some embodiments, the filtering options include filtering criteria for filtering receivables. As described above, the filtering criteria can be according to a variety of factors, such as attributes of receivables. In some embodiments, the filtering criteria can include charge pattern, charge priority, or any other appropriate type of (metadata) attribute associated with a receivable. In some embodiments, higher level criteria that are applicable under certain conditions can be specified as well. For example, a delinquency provision filter can be specified where, if a targeted policy is delinquent, all past due/delinquent charges are included in an allocation set. In some embodiments, conditions for whether a filter should be applied at runtime can be specified, where the conditions are determined, for example, using information obtained at runtime.

At 404, a selection from the user of the set of filtering options is received. For example, the user can select from the various filtering options to select a combination of filtering criteria that are used to refine a set of candidate receivables into a set of eligible receivables. In some embodiments, the program code for each filter that will be executed at runtime at the time of funds allocation is stored in a backend data store, while a label corresponding to each option is presented in a user interface (UI)-based tool accessible by the user. In some embodiments, the user selects a filter by selecting the corresponding label for the desired filter.

At 406, a user is presented a set of priority criteria to select and sort. In some embodiments, the priority criteria include allocation priority rules implemented using comparators. In some embodiments, a user is presented in a user interface with candidate comparators from which the user can select desired comparators. The sorted selection of comparators is used to determine a relative ranking of receivables.

Various criteria can be used to prioritize receivables. One example criteria that can be used to compare receivables is a charge pattern. The charge pattern of a receivable indicates the type of the receivable and the insurance element to which it belongs (e.g., a premium type charge for a comprehensive coverage insurance element). In the case a cash payment is received, one charge pattern can be prioritized over another, so that receivables can be prioritized by their charge pattern attribute.

Another example criteria/receivable attribute is charge group, which indicates the type of the receivable (e.g., premium type, fee type, tax type, etc.). One example of a prioritization scheme is that charge pattern is most important, charge group is next important, and then all other criteria are of equal priority.

In some embodiments, comparators include conditions specifying when the comparator is to be applied (e.g., if a policy period or invoice is targeted at runtime).

At 408, a sorted selection based on the set of priority criteria is received. The sorted selection indicates the relative importance of the prioritization criteria. As one example, in the user interface, the user can specify a ranking of the criteria/comparators by ordering them vertically, with the highest criteria having the highest priority, and the lowest criteria the lowest priority. At 410, the selections are stored. In some embodiments, the selection of filters and comparators comprise a fund allocation plan. In some embodiments, the fund allocation plan is a template/type of plan that is stored, and which can be assigned to different policies/accounts. For example, the funds allocation plans can be assigned to different segments of insurance policy holders. For example, funds allocation plans can be assigned to various types of insurance accounts/policies.

In some embodiments, a user can configure different sets of filtering criteria/priority criteria to apply given different contexts. For example, a user can specify a rule set/allocation plan for handling cash payments (e.g., a payment allocation plan) such that receivables will be cleared in a first-in, first-out manner. As another example, a user can configure a plan for handling credit payments (e.g., a return premium allocation plan), such that they are applied last to first (e.g., temporally, in terms of bill date, in reverse chronological order) or applied proportionally (e.g., for return premium endorsements).

At 412, a fund allocation plan is assigned to an insurance policy or an insurance policy account. In some embodiments, a fund allocation plan is assigned (either automatically or manually) to the insurance policy or the insurance account at the time that the policy or account is created. In some embodiments, a particular fund allocation plan can be configured to automatically be assigned to particular types of policies or accounts. For example, a fund allocation plan template specific to personal automobile policies can be configured, and automatically assigned to personal auto policies whenever they are created.

Figure 5:
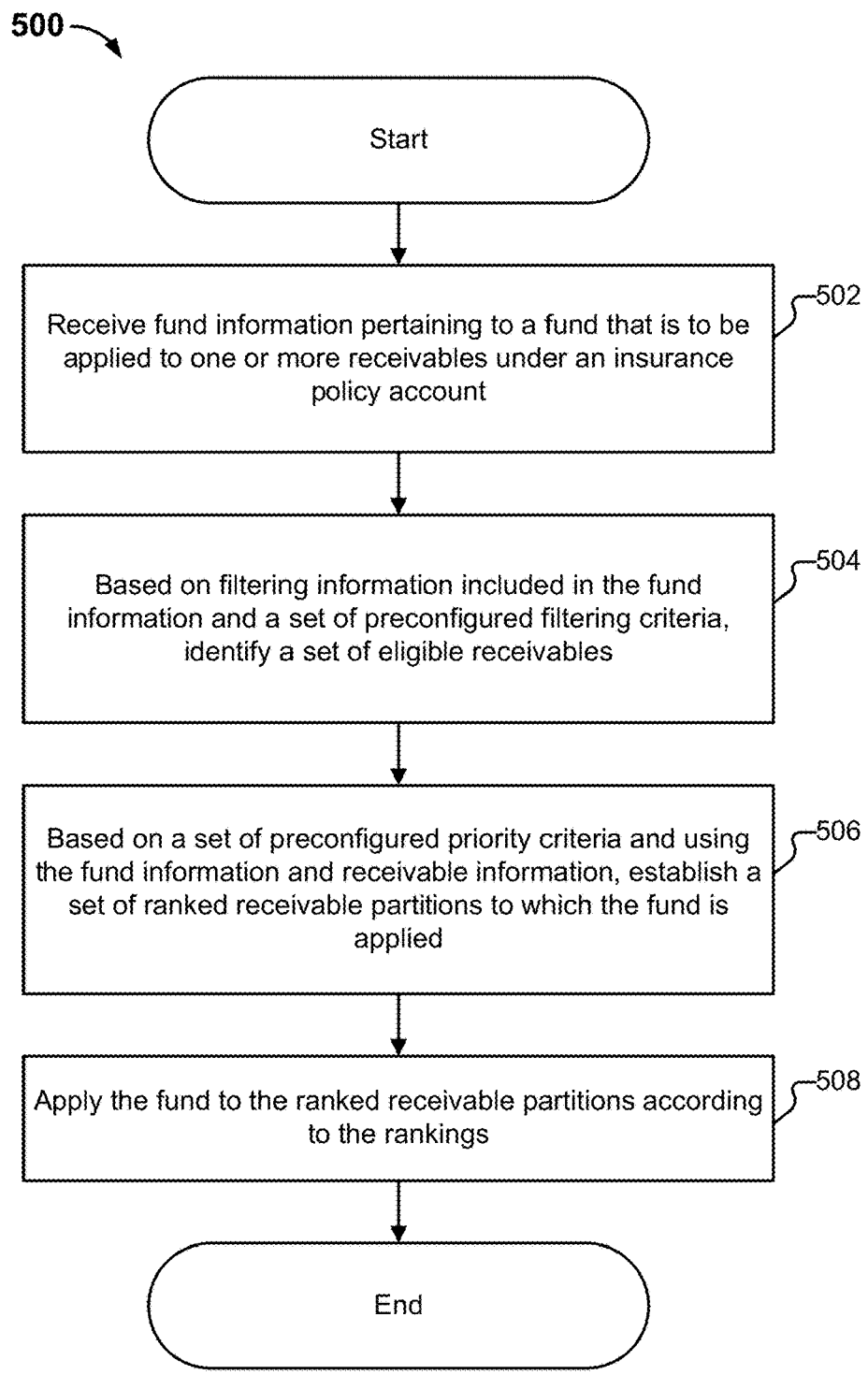
FIG. 5 is a flow diagram illustrating an embodiment of a process for applying a fund to one or more insurance policies of an insurance account.

FIG. 5 is a flow diagram illustrating an embodiment of a process for applying a fund to one or more insurance policies of an insurance account. In some embodiments, process 500 is executed by funds allocation engine 304 of FIG. 3. The process begins at 502 when fund information pertaining to a fund that is to be applied to one or more receivables under an insurance policy account is received. The fund can include cash payments and credits. In various embodiments, the fund information includes an amount to be applied and metadata information such as an insurance policy number, an invoice number, an insurance account number, a specific charge (to be cleared by the fund), etc. In some embodiments, the fund information includes information associated with a routing number of a financial institution (e.g., identified on a check), which may be associated with/mapped to a corresponding policy number. As will be described in more detail below, the fund information associated with a fund can be used in determining a set of eligible receivables that are qualified to be paid by the fund.

At 504, a set of eligible receivables is identified based on filtering information included in the fund information and a set of preconfigured filtering criteria. In some embodiments, fund information such as a policy number, an invoice number, an account number, a type of the fund, a charge pattern, etc. (e.g., identified in a coupon received with a payment, or as an attribute of a credit) can be used as filtering information, for example, to determine an initial set of receivables. As one example, if a policy number is received, then those receivables associated with the policy number are obtained. As another example, if an invoice number is received as part of the fund information, than the receivables associated with the invoice number are obtained as the initial set of receivables. In some embodiments, if the fund information includes information associated with a financial institution, such as a bank routing number, the information may be associated with an insurance policy/account and can be used to obtain an initial set of receivables. For example, if a previous check with the routing number has been used to pay for receivables due for a particular insurance policy, then the policy number can be obtained even if it is not explicitly indicated on the payment (e.g., in the memo of a check).

In some embodiments, the preconfigured filtering criteria are included in a fund allocation plan. The fund allocation application can be identified/obtained, for example, via fund information. For example, if an insurance policy or account number is included in the fund information, then the funds allocation plan associated with the insurance policy/account is obtained. The filtering criteria configured for the funds allocation plan are then used to identify the set of eligible receivables. In some embodiments, the preconfigured filtering criteria include various types of receivable attributes upon which obtained receivables are filtered. The types of receivable attributes include charge group, charge pattern, coverage identifier, or any other appropriate type of receivable attributes. In some embodiments, the preconfigured filtering criteria include filters configured by a user via a UI-based tool, as described above.

At 506, a set of ranked receivable partitions to which the fund is applied is established based on a set of preconfigured priority criteria and using the fund information and receivable information. In some embodiments, the preconfigured criteria include metadata attributes of receivables. For example, receivables can be prioritized based on charge type, charge pattern, charge priority, or any other appropriate types of receivable attributes. In some embodiments, the set of eligible receivables is prioritized by compartmentalizing the eligible receivables into the ranked receivable partitions. In some embodiments, establishing the ranked receivable partitions is performed by constructing a tree based on the set of preconfigured priority criteria and fund information as described above. In some embodiments, the fund information is used to determine a portion of the tree to construct. Fund information can also be used to determine the conditions that direct how prioritization is to be performed. For example, the type of comparisons to be performed can depend on the target of a payment (e.g., policy period vs. invoice). In some embodiments, the preconfigured priority criteria are based on the sorted selection of comparators as described above.

In some embodiments, the filtering, partitioning, and/or ranking are interwoven/injected along with the database query to facilitate faster execution such that the injected filtering, partitioning, and/or ranking are not performed on an in-memory collection. Under such an example paradigm, the filters and comparators (e.g., expressed in a language such as Gosu) are pre-processed, for example, into partial SQL/SQL like statements (e.g., using "where" and "sort-by" clauses) that are appended to the SQL query that fetches the receivable from database to memory. Thus, when these receivables are loaded into memory, they automatically use a sorted-set data structure is automatically used, therefore allowing performance-intensive in-memory operations to be avoided.

In some embodiments, the eligible receivables are ranked at least in part by constructing a decision tree/graph such as a binary decision tree to determine the ranked partition into which a receivable in the set of eligible receivables is to be compartmentalized. Compartmentalizing the qualified items can include placing the invoice items/receivables in appropriate buckets. As described above, in some embodiments, a binary decision tree data structure is used to perform the bucketing. In some embodiments, the leaf nodes of the binary decision tree are the partitions into which items are ultimately bucketed, while other nodes in the tree are decision points in which the relative ranking of items is performed. For example, when a receivable arrives at a node of the binary decision tree, a comparator is used to determine whether the receivable item flows down the left or right branch. At each node, the receivable is processed/evaluated by a comparator to determine which path is taken by the receivable until the receivable reaches a leaf node partition. The ranking of the item is determined by the partition in which the invoice item lands. In some embodiments, the decision tree is constructed at runtime, using contextual information associated with the received fund (e.g., received fund information).

At 508, the fund is applied to the ranked receivable partitions according to the rankings In the example of the binary decision tree, the tree can be structured such that items in the leftmost leaf node are of the highest priority and that the rightmost leaf node includes the lowest priority items, where items within the same partition are of equal priority. In some embodiments, the fund is applied according to the rankings of the ranked receivable partitions, for example, from the left most leaf node/partition to the right most leaf node/partition. In some embodiments, the partitions are cleared one partition at a time, where all items in a partition are cleared until moving onto the next partition in the priority sequence. In some embodiments, if a partition is arrived at, but there are insufficient funds to completely clear all of the items in the partition, the remaining funds are applied pro rata (e.g., the remaining funds are dispersed uniformly among the items within the partition).

UI Interface Examples

FIGS. 6-10 are example interfaces of a user interface (UI)-based tool/wizard for configuring funds allocation plans.

Figure 6:
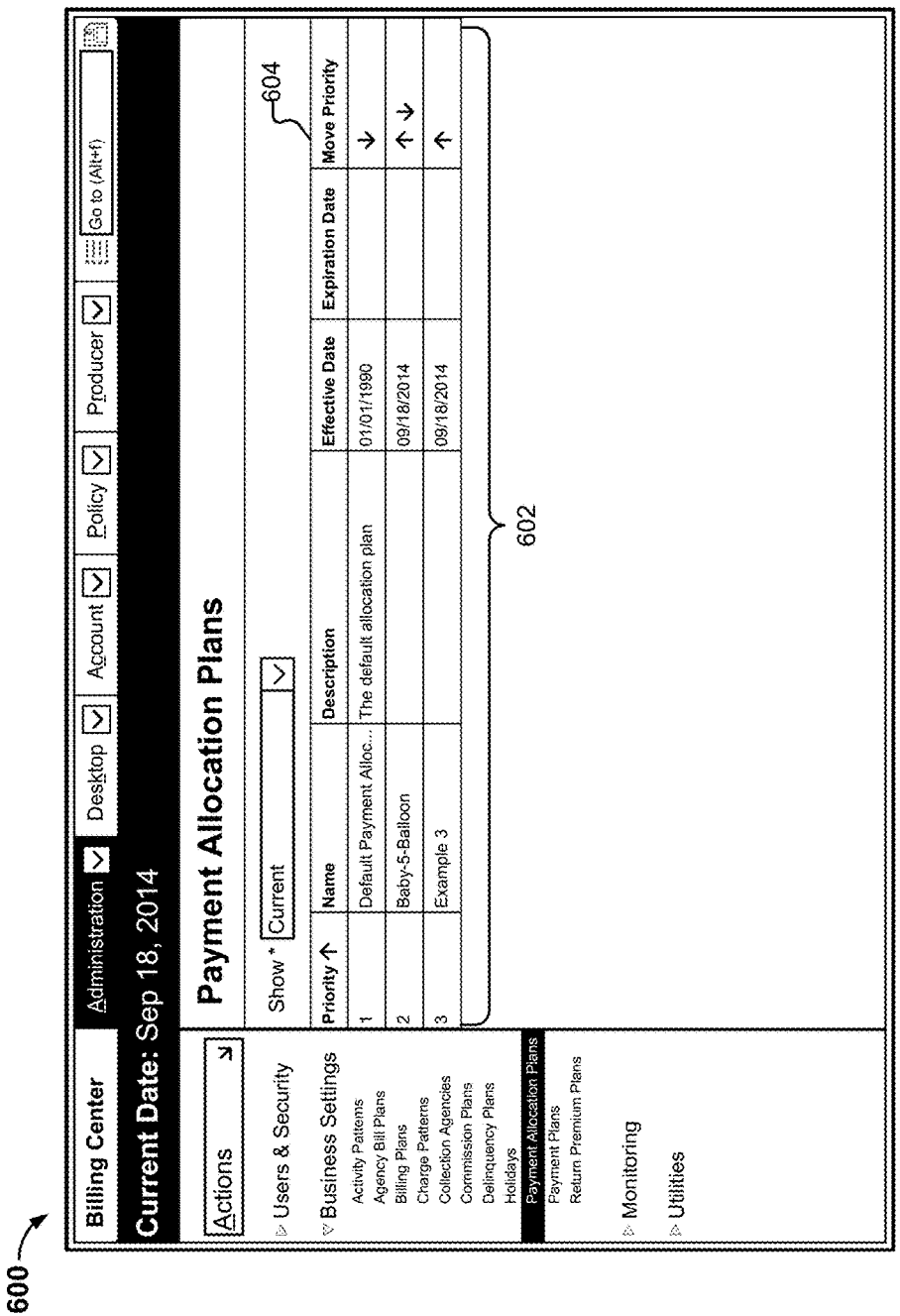
FIG. 6 is an example of an interface for configuring payment allocation plans.
Figure 7:
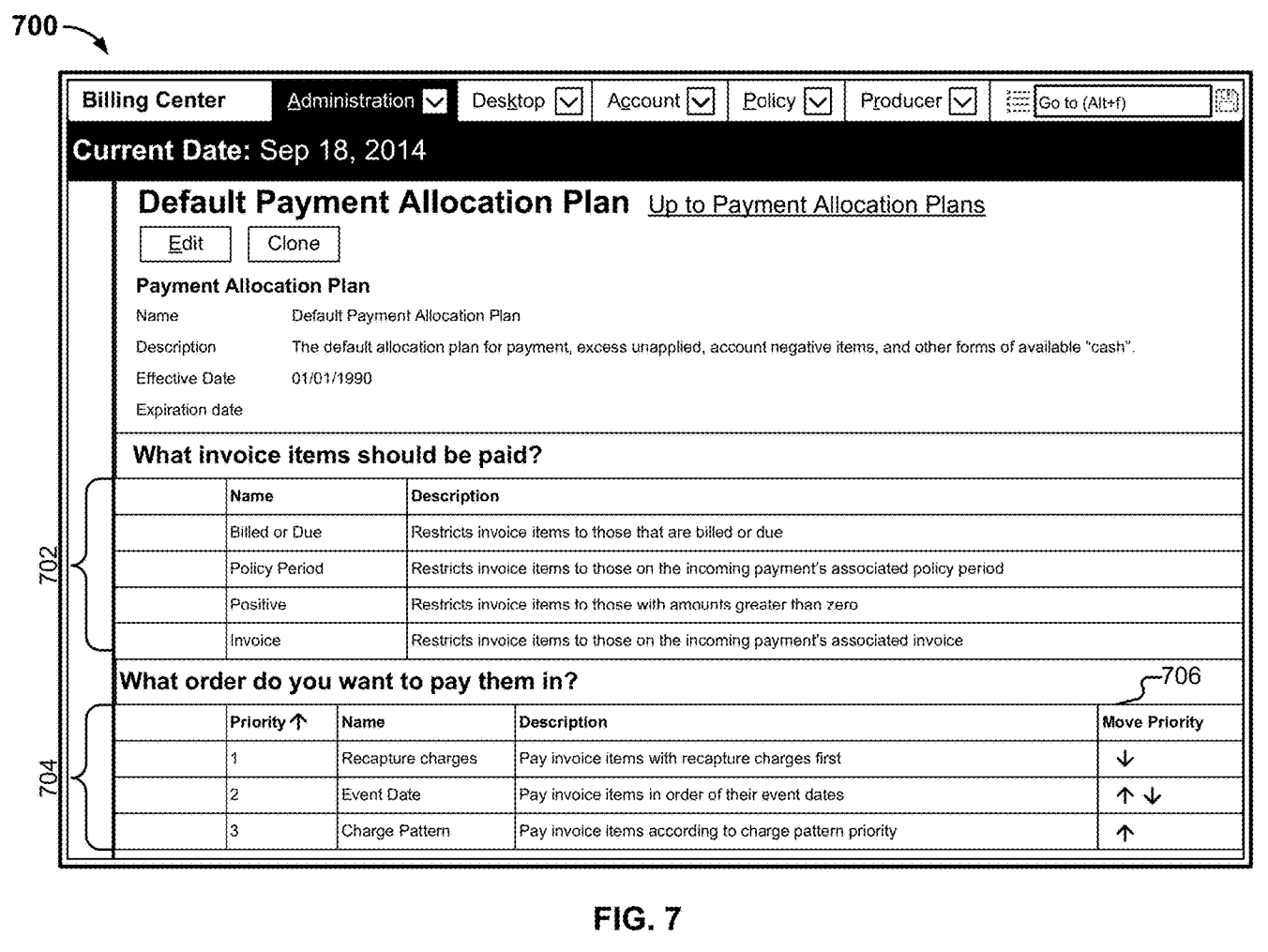

FIGS. 6-7 show example interfaces for configuring payment allocation plans. FIG. 6 is an example of an interface 600 for configuring payment allocation plans. Using the interfaces, a customer can create one or many payment allocation plans. In this example, at 602, three payment allocation plans that have been created, one of which is a default payment allocation plan, are shown. As shown, the priority of the payment allocation plans can also be specified using the arrow controls at 604. Further information associated with each of the three payment allocation plans is shown, such as the effective dates for the respective payment allocation plans.

FIG. 7 is an example of an interface 700 for configuring a payment allocation plan. In this example, the configuration of the default payment allocation plan of FIG. 6 is shown. The default payment allocation plan is to be used for payment, excess unapplied, account negative items, and other forms of available payments such as cash payments. As shown in the example, the payment allocation plan includes two sections. The first section (702) includes controls for specifying what invoice items should be paid. These correspond to filters for determining what items are qualified to be paid. The second section (704) is for capturing the order in which qualified items must be paid (i.e., via comparators). The relative priority of the charges in section 704 can be changed using the arrows at 706. In this example, the priority of the charges is displayed visually, with the highest priority charge displayed at the top of the list of charges, and the lowest priority charge displayed at the bottom of the list of charges. In some embodiments, the prioritization is used to configure comparators, which are used to implement the ordering/prioritization.

Figure 8:
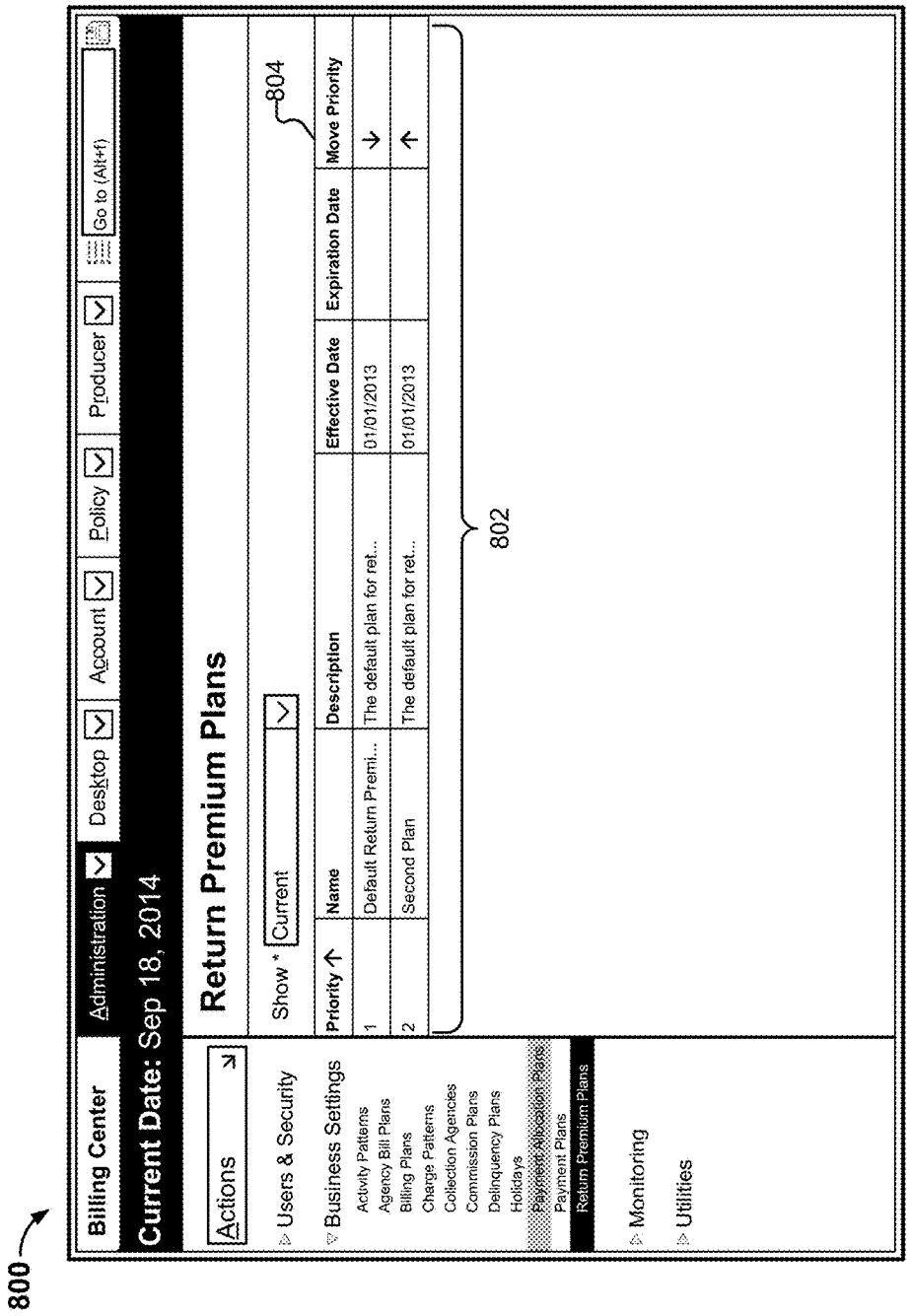
FIG. 8 is an example of an interface for configuring return premium plans.
Figure 9:
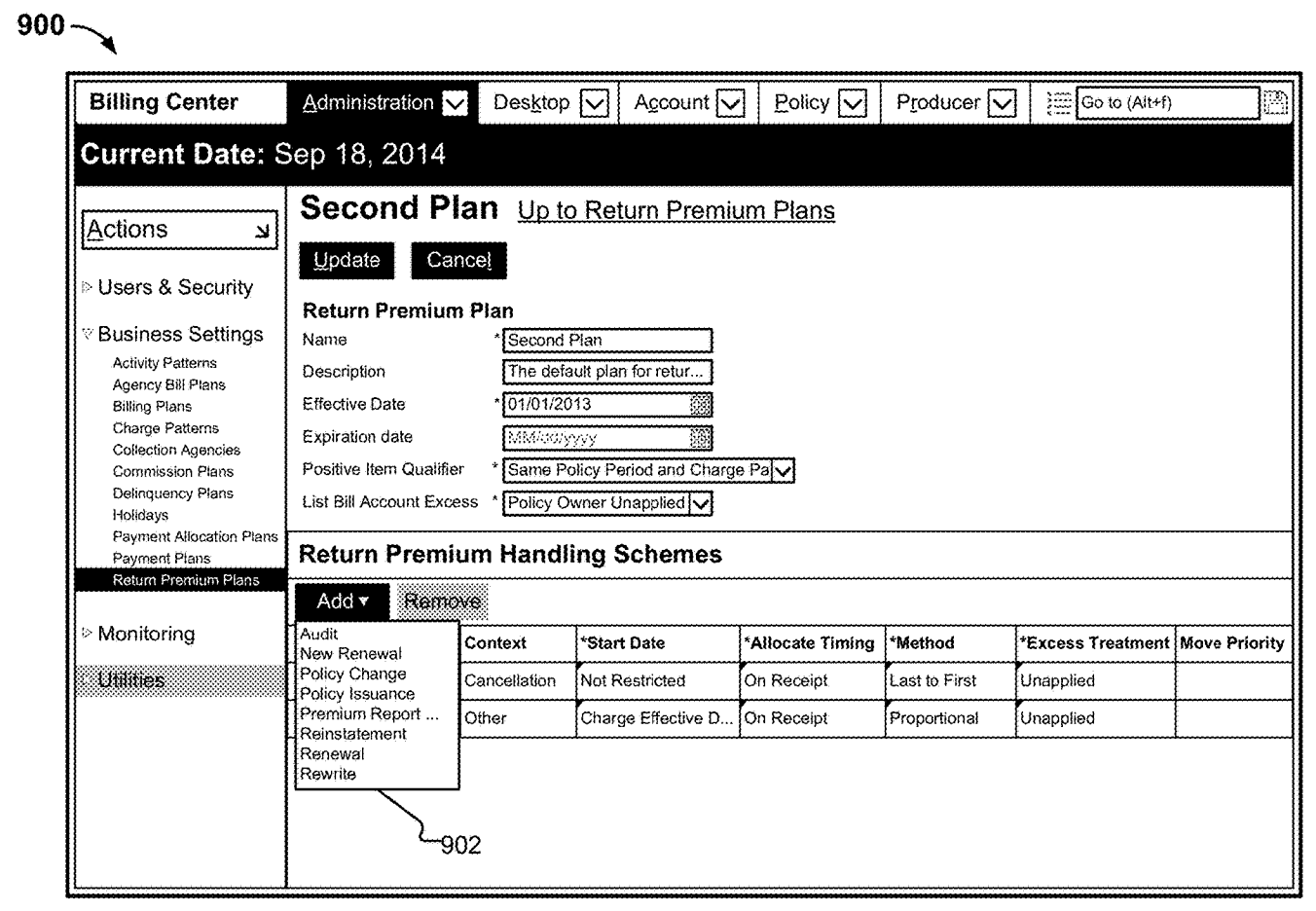

FIGS. 8-9 are example interfaces for configuring return premium plans. In some embodiments, return premium plans are configured to govern the allocation of credits associated with cancellations or return premium policy changes.

FIG. 8 is an example of an interface 800 for configuring return premium plans. Using the interfaces, a customer can create one or many return premium plans. In the example of FIG. 8, two return premium plans, including a default return premium plan, are shown at 802. In this example, the relative priority of the return premium plans can be specified, for example, using the arrow controls at 804. Further information associated with each of the return premium plans is shown, such as the effective dates for the return premium plans.

FIG. 9 is an example of an interface 900 for configuring a return premium plan. In this example, configuration of the second plan of FIG. 8 is shown. In some embodiments, the return premium plans can be used to handle return premiums originating from various events, such as an endorsement (e.g., removal of coverage), cancellation, audit, etc. In this example, configuration of return premium handling schemes for the return premium plan is shown. As shown, at 902, a user can select the schemes to be handled by the return premium plan, such as cancellation, audit, new renewal, policy change, policy issuance, premium report business instruction, reinstatement, renewal, and rewrite.

Figure 10:
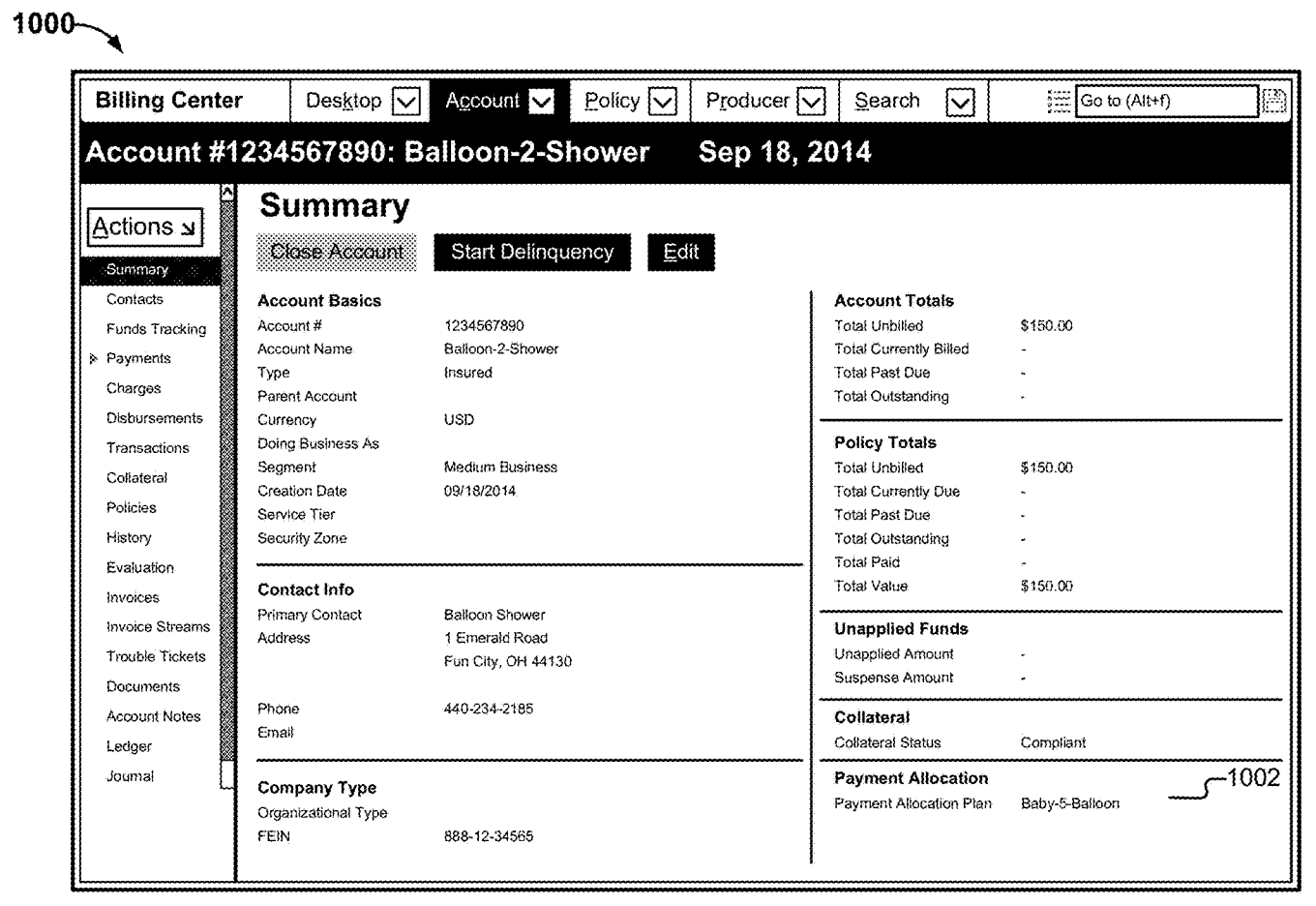

FIG. 10 is an example of an interface 1000 for viewing a summary of an account. In some embodiments, each account in an insurance policy system is assigned a payment allocation plan, as shown at 1002. For example, an insurance carrier can assign two different plans to two accounts based on their past history or the type of policies that are owned. In some embodiments, each policy term can specify a return premium plan.

Further Funds Allocation Plan Examples

As described above, different funds allocation plans assigned to an insurance policy/account can be configured by a user to be applied under various conditions/scenarios, such as whether a target policy is in a delinquency state, the received funds is a cash payment, the received funds is a credit, etc. Examples of configuring and using funds allocation plans such as payment allocation plans and return premium plans to account for such conditions will be provided in more detail below.

Delinquency Provision Example

As described above, filters are configured to process a universal set of receivables and return an eligible/qualified set of receivables, based, for example, on the intersection of the criteria associated with the filters. However, suppose that a policy indicated in funds information is determined to be delinquent. A higher level filter can be configured as a delinquency provision. For example, while a funds allocation plan may have a set of filters to apply if a policy is not delinquent, where the intersection of the filters determines the eligible receivables, in some embodiments, the delinquency provision filter is configured to include all charges that are delinquent into the allocation set (i.e., union). In some embodiments, configuring of higher level provisions such as a delinquency provision allows a user to enlarge an allocation set without making the set definition cumbersome (e.g., without requiring defining a new set of rules specifically for handling delinquency).

As another example of using a delinquency provision filter, if a payment is received for a policy that is determined to be delinquent and cancelled for non-pay delinquency, there are potentially other charges to be expected of this policy. For example, if a delinquent policy that has been cancelled was to be reinstated, the reinstatement would include a corresponding set of charges/receivables. In some scenarios, the received payment should be held to be applied to anticipated positive charges such as those associated with reinstatement. Thus, in order to keep the payment held and prevent the received payment from being allocated, the delinquency provision can be specified to exclude receivables from other policies from being eligible to be cleared. The received funds can then be considered as excess and held in suspense, such that the received funds will not be allocated until the delinquent policy is reinstated/no longer delinquent.

Thus, a delinquency provision is an example of a dimension on which receivables can be filtered and added to an allocation set, where the filter is applied if the delinquency condition is met.

Payment/Credit Funds Allocation Plan Examples

The manner in which a fund is to be allocated can differ based on the type of funds received. Using the funds allocation plan configuration engine, a user can configure different filtering options and priority criteria to create, for example, a payment allocation plan to be applied on the condition that a cash payment type fund is received, and a return premium allocation plan to be applied on the condition that a credit type fund is received.

The ability to create plans that apply under different conditions can be used, for example, to account for the different manners in which different types of funds such as cash payments and credits should be applied, which can influence how funds are to be allocated. For example, credit allocation plans, which already include corresponding target identification information (e.g., such as a policy number) can be configured differently from payment allocation plans that are configured for handling cash payments. In the case of credits, in some embodiments, when a policy system creates the credit, the policy system specifies the target identification information for the credit, such as a corresponding insurance policy number, an identifier for the receivable to which the credit is to be applied, etc. (e.g., the target to which the credit should be paid will not be null). This information can be used to obtain the eligible set of receivables (and filtering may not be necessary as the receivables to which the credit should be applied are known). While a credit already has a corresponding equal and opposite receivable to which the credit is to be applied (i.e., the credit was created to clear a specific set of receivables), in contrast, a received cash payment is neutral and fungible, and given a limited amount of received funds information, it may not be clear as to what specific receivables the cash payment should be applied. Thus, in a payment allocation plan, filters can be configured to automatically determine what receivables should be reconciled given a received payment. Thus, the requirements for determining how cash payments and credits should be applied can differ. Using the techniques described above, a user can configure funds allocation plans (by specifying filters and comparators) to handle such scenarios. Examples of a payment allocation plan and a return premium allocation plan are described below.

Payment Allocation Plan Example

As described above, while credits may include attributes such as insurance policy numbers and charge patterns which can be used to identify/directly map to an appropriate/ corresponding set of receivables to be cleared, other types of funds, such as cash payments (e.g., received in the form of a check), may have limited amounts of funds information by which to explicitly identify the set of receivables to be cleared and how they are to be cleared. In some embodiments, a billing platform is configured to filter receivables to determine an appropriate set of receivables to clear using the fund, as well as rank the set of receivables to determine the priority in which the set of receivables is to be paid/funds are to be allocated. In some embodiments, the billing platform is configured to determine, given the amount of received funds and the presence of any identification information from which a target of the funds can be inferred, a set of receivables to be cleared by the funds and the priority in which the receivables are to be cleared.

Suppose, for example, that an auto policy is associated with an installment plan. Each of the installments is associated with attributes such as bill date (date that bill was sent), due date (date on which payment was sent out), planned invoice date (date on which an invoice is planned to be sent out for a future installment), etc. In some embodiments, the age of the installments is tracked (e.g., the time from when a bill was sent out), as well as the amount left unpaid for installments. In the case of installments for auto policies, where drivers are required to have auto insurance, an insurance carrier may be required to report to authorities the age of the installments. Additionally, installments, after a certain date, may become stale, and no longer admissible as assets. In order to prevent any lapses in auto coverage or receivables from becoming inadmissible, any cash payments received should be immediately applied to installments with time sensitivities. For example, the cash payments should be applied in a first-in, first-out manner so that the oldest receivables are cleared first ahead of other receivables (e.g., that are not past due).

In order to implement such FIFO cash payment allocation, a funds configuration plan can be configured to filter for receivables based on bill status, where the eligible receivables are then prioritized (based on a sorted selection of comparators), for example, by age or past due date. Thus, in the auto example above, the payment will be applied to installments on a first-in, first-out basis (e.g., temporally, in chronological order, from oldest receivables to newest receivables by date), preventing receivables from becoming stale and inadmissible assets.

In some embodiments, cash payment plans are attributed/ assigned at either the account or policy level. This allows, for example, for cash (which is fungible) to be applied to multiple policies if necessary.

Return Premium Allocation Plan Example

In some embodiments, credit allocation plans (e.g., return premium plans as described above) are attributed/assigned at the policy level. In some embodiments, credits, when received, include fund information such as a corresponding insurance policy and the receivables to which the credits are to be applied. The received fund information can be used to identify the set of receivables to which the credit is to be applied. In some embodiments, the manner in which the received credit is to be allocated can vary depending on the type of credit and the context in which the credit was received (e.g., that the credit was received in response to a policy cancellation, a change in coverage, a policy endorsement, etc.).

For example, depending on the context of the received fund, the fund may need to be applied, for example, from last to first (e.g., for cancellation credits), proportionally across receivables (e.g., for return premium endorsement credits), etc. Using the techniques described above, a user such as Alice can configure funds allocation plans to allocate funds based on various conditions associated with credits.

For example, credits can be associated with endorsements (also referred to herein as policy changes). One example of an endorsement/policy change is cancelling a policy. If a policy has a previously established billing installment schedule (e.g., that governs the billing of installments), then a cancellation credit that is received should be used to clear out future installments, starting from the last installment and moving toward the most current, so that the policy holder will not be billed going forward.

Suppose, for example, that a policy holder has a policy that as originally created, begins in January and ends in December at the end of the year. However, in June, the policy holder indicates that they would like their policy to be cancelled at the end of August. When the policy was originally created, a payment schedule of 12 monthly installments was created. Now that the policy holder would like to have the policy cancelled, credits are applied to clear out the originally created installments from September to December. In this example, all installments from September onward are to be zeroed out completely, such that the policy holder will not receive any bills for installments starting from September. Thus, for funds such as cancellation credits, the credits should be allocated in the order of last invoice item to first (e.g., from the installment furthest out in time, and continuing towards the present time, in reverse chronological order), with each invoice item completely zeroed out (thereby removing the invoice item) before moving onto clearing the next invoice item.

In some embodiments, in order to implement the last to first credit allocation, a funds allocation plan can be configured such that if a cancellation credit for an insurance policy is received, the filters are used to obtain the remaining installments as an eligible set of receivables (e.g., based on planned invoice bill date). The funds allocation plan is then configured, for example, by a user indicating a sorted selection of comparators, to prioritize the installments by bill date, where the bill dates furthest out are of the highest priority. Thus, when the cancellation credit is allocated, it will begin by clearing out the installments with the latest bill date.

There may also be scenarios in which credits should be applied proportionally. For example, suppose that a policy holder has an auto policy covering two vehicles, with invoices sent out in monthly installments to collect money for the insurance coverage. Suppose that both cars receive insurance coverage, but that one of the coverages for one of the vehicles has been removed. The total premiums due from a user should therefore be reduced given the reduction in coverage. As the policy is still in effect, but the coverage has been reduced, credits are assigned that should be used to reduce the already existing installments, which were pre-planned at the time the payment schedule for the installments was created. In this scenario, the credit is to be allocated in a manner that reduces the amount due on future installments uniformly (e.g., by splitting/dividing the credit by the number of months remaining).

In some embodiments, in order to implement the proportional allocation of the credits, a funds allocation plan can be configured such that if a credit associated with a reduction in coverage is received, the filters are used to obtain the remaining installments as an eligible set of receivables (e.g., based on planned invoice bill date). The funds allocation plan is then configured with a sorted selection of comparators that prioritize the installments equally, so that the credit will be applied pro rata (proportionally applied across the remaining installments).

Thus, the policy holder is still billed with the same frequency as specified by the payment schedule originally, but the previously planned installments have been adjusted according to the reduction in coverage (where the adjustment is performed by applying credits to the original installments).

Prioritization Decision Graph Example

Figure 11:
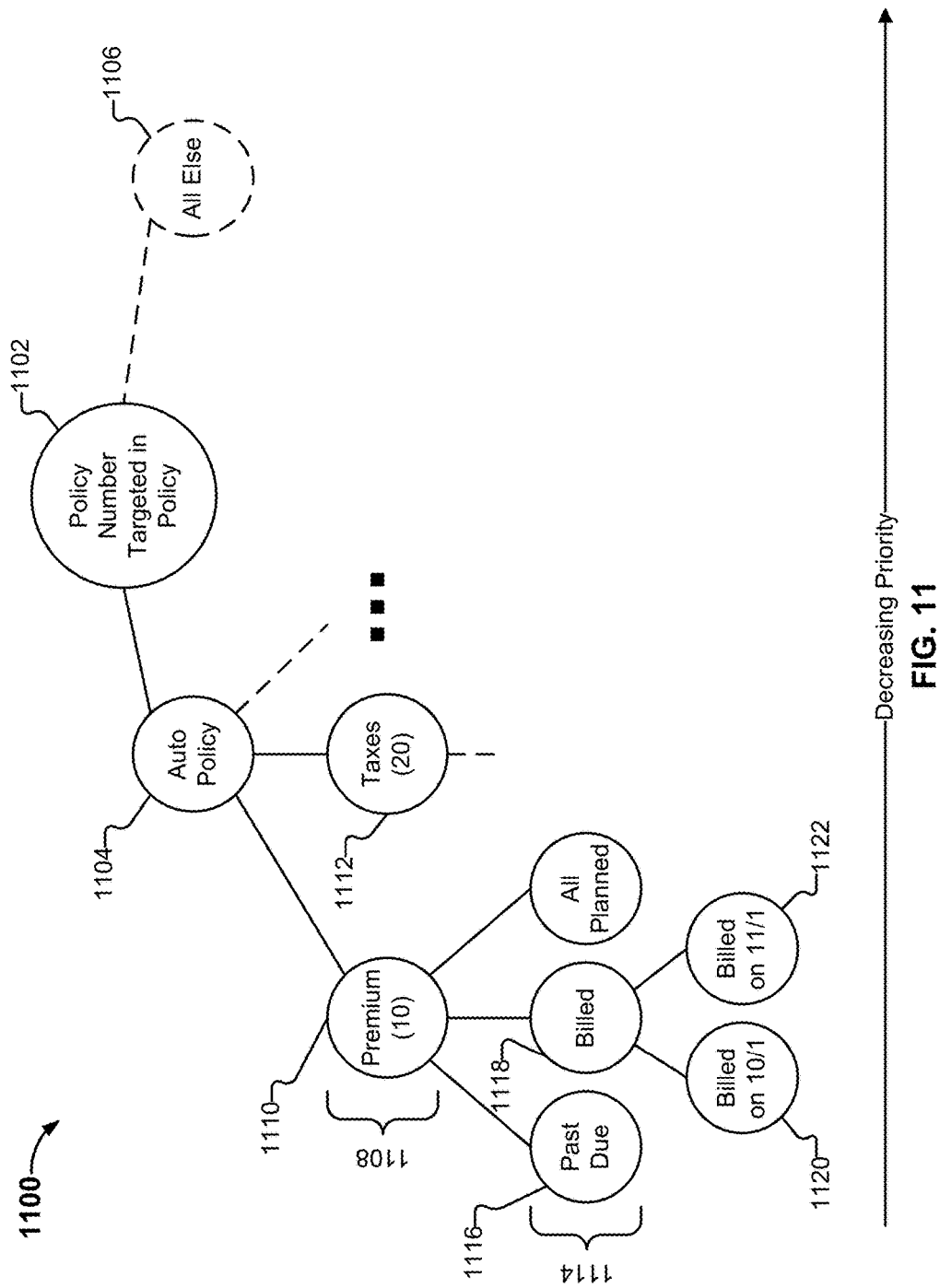
FIG. 11 is an example embodiment of a decision graph for prioritizing receivables.

FIG. 11 is an example embodiment of a decision graph for prioritizing receivables. In some embodiments, decision graph 1100 is generated using a ranking engine such as ranking engine 318 of FIG. 3. In this example, suppose that an incoming cash payment is to be allocated. As a cash payment has been received, a cash payment allocation plan is used to generate the decision graph at allocation runtime. In some embodiments, the decision graph is generated according to prioritization criteria and comparators specified in the cash payment allocation plan, as well as information about the incoming payment. In some embodiments, decision graph 1100 is an example of a graph used to prioritize a set of eligible, qualified receivables, as determined according to filtering criteria, as described above. In this example, a receivable in the qualified set of receivables is prioritized according to three criteria: the policy period (policy number and term number) with which the receivable is associated, the charge pattern of the receivable, and the bill status of the receivable.

In this example, suppose that a payment has been received that targets an auto-policy period number (e.g., the funds information includes a targeted auto policy number and term number). According to the top node of the decision graph (1102), all receivables that are associated with the auto-policy period targeted by the received payment are prioritized highest and proceed down the left fork to 1104, while all other items move down the right fork to 1106 (e.g., the receivables in the eligible set that are associated with policies other than the targeted auto-policy, such as maritime policies, home policies, etc.).

At the next level (1108), receivables are prioritized according to charge pattern type criteria. In this example, receivables that are of a premium-type charge pattern move to node 1110, receivables that are taxes move to 1112, etc. As shown, the premium charge pattern 1110 is more important than taxes 1112, as it is positioned to the left of node 1112. In some embodiments, the different types of charge patterns are ordered according to assigned weights/priorities. For example, when configuring a comparator for prioritizing receivables by charge pattern, premium-type charges can be assigned a priority of 10, while taxes are assigned a priority of 20, while all other types of charge patterns are assigned the same priority of 30 (and are therefore equally important).

At the next level 1114, receivables are prioritized according to bill status criteria. In this example, the bill status of receivables is evaluated to determine whether a receivable is past due, billed, or planned (e.g., planned to be billed). In this example, receivables that have a bill status of past due are of the highest priority, and any receivables that have a bill status of past due proceed to node 1116. In this example, node 1116 is a leaf node, comprising a partition. As the node 1116 is the leftmost leaf node in the decision graph, leaf node 1116 is the highest priority partition into which receivable items can land. Examples of the receivable items that land in the partition of node 1116 include auto-policy-related receivables that are premiums that are past due.

If a receivable is not past due, and has been billed, then the receivable proceeds to node 1118. In this example, the receivable is then further prioritized according to the exact bill date of the receivable. In this example, billed items are partitioned into leaf nodes 1120 and 1122. Leaf node 1120 is a partition for receivable items billed on October $1^{st}$ while leaf node 1122 is a partition for receivable items billed on November $1^{st}$. As shown, partition leaf node 1120 is placed to the left of node 1122 such that items that are billed earlier are paid first.

A received payment can then be used to clear the partitions starting from the leftmost leaf node and then progressing rightwards (i.e., partition priority decreases from leftmost left node to rightmost leaf node).

In the example decision graph of FIG. 11, the decision graph was dynamically generated at runtime using data available on the eligible set of filtered items. For example, leaf nodes 1120 and 1122, representing partitions for two distinct bill dates, are dynamically generated at runtime based on an inspection/evaluation of the attributes of the billed items in the filtered set of eligible items. In this example, an evaluation of the billed items in the eligible set determined that the billed items in the eligible set were billed either on October $1^{st}$ or November $1^{st}$ (e.g., by evaluating an attribute of the billed items that indicates the date upon which an item was billed). If, for example, an evaluation of the billed items had determined that the billed items in the eligible set further included items that were billed on September $1^{st}$, then the decision graph would be dynamically generated to include a leaf node partition for holding items billed on September $1^{st}$.

Using a decision graph as described above, an eligible set of receivables (e.g., as determined according to filtering criteria, as described above) is prioritized according to prioritization criteria specified in a funds allocation plan. The eligible items are partitioned into a set of ranked partitions, which are used to determine how a received fund is to be allocated to the eligible receivables.

Configuration of funds allocation plans and application of funds has been described. Configuration of funds allocation plans facilitates the configuration of rules and heuristics for defining funds allocation, particularly in allowing the user control in configuring how funds should be applied based on fund information at allocation time.

A system for configuring a funds allocation plan with respect to one or more insurance policies of an insurance account is described. The system includes a funds allocation plan configuration engine to present to a user a set of filtering options; receive a selection from the user of the set of filtering options; present to the user a set of priority criteria to select and sort; receive a sorted selection based on the set of priority criteria; store the selection; and assign a funds allocation plan to an insurance policy or an insurance policy account.

A system for applying a fund to one or more insurance policies of an insurance account is described. The system includes a funds application engine to receive fund information pertaining to a fund that is to be applied to one or more receivables under an insurance policy account; identify a set of eligible receivables based on filtering information included in the fund information and a set of preconfigured filtering criteria; establish a set of ranked receivable partitions to which the fund is applied based on a set of preconfigured priority criteria and using the fund information and receivable information; and apply the fund to the ranked receivable partitions according to the rankings.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a data store configured to store preconfigured code portions corresponding to a set of candidate filters;
   a configuration display engine configured to:
      display, in a user interface, visual representations of the set of candidate filters; and
      receive, via the user interface, a user interaction with respect to a visual representation of a filter in the set of candidate filters, wherein the filter is selected based at least in part on the user interaction with respect to the visual representation of the filter;
   a funds processing engine configured to receive fund information pertaining to a fund that is to be applied to one or more receivables under an insurance policy account;
   a filtering engine configured to, using a set of one or more processors, identify a set of eligible receivables based on filtering information included in the fund information and the selected filter, wherein to identify the set of eligible receivables includes to:
      obtain, from the data store, a preconfigured code portion corresponding to the filter selected based at least in part on the user interaction with respect to the visual representation of the filter;
      query the data store for the one or more receivables under the insurance policy account to obtain the set of eligible receivables, wherein the query includes the preconfigured code portion corresponding to the filter selected based at least in part on the user interaction with respect to the visual representation of the filter; and
      load the set of eligible receivables into memory;
   a ranking engine configured to establish a set of ranked receivable partitions to which the fund is applied based on a set of preconfigured priority criteria and using the fund information and information associated with the set of eligible receivables; and
   a funds application engine configured to apply the fund to the ranked receivable partitions according to rankings.

2. The system of claim 1, wherein the fund information includes at least one of an amount, a policy number, an invoice number, and an insurance account number.

3. The system of claim 1, wherein the fund comprises a cash payment or a credit.

4. The system of claim 1, wherein the selected filter is associated with a set of receivable attributes.

5. The system of claim 1, wherein the selected filter is associated with a charge pattern, a coverage identifier, or both.

6. The system of claim 1, wherein the selected filter is associated with a charge group.

7. The system of claim 1, wherein a credit is configured to be applied to receivables in reverse chronological order.

8. The system of claim 1, wherein a payment is configured to be applied to receivables in chronological order.

9. The system of claim 1, wherein establishing the set of ranked receivable partitions includes constructing a tree based on the set of preconfigured priority criteria.

10. The system of claim 9, wherein the tree is constructed at runtime.

11. The system of claim 9, wherein the tree is a binary decision tree.

12. The system of claim 1, wherein the ranking engine is further configured to compartmentalize the identified set of eligible receivables into the established set of ranked receivable partitions.

13. The system of claim 1, wherein the configuration display engine is further configured to display a set of interfaces for configuring priority criteria and receiving user configurations of the priority criteria.

14. The system of claim 13, wherein the configuration display engine is further configured to display visual representations associated with a set of candidate priority criteria, and wherein the user configurations of the priority criteria include a selection, based at in part on user interaction with at least some of the displayed visual representations, of a set of priority criteria from the set of candidate priority criteria.

15. A method, comprising:
- storing, in a data store, preconfigured code portions corresponding to a set of candidate filters;
- displaying, in a user interface, visual representations of the set of candidate filters;
- receiving, via the user interface, a user interaction with respect to a visual representation of a filter in the set of candidate filters, wherein the filter is selected based at least in part on the user interaction with respect to the visual representation of the filter;
- receiving fund information pertaining to a fund that is to be applied to one or more receivables under an insurance policy account;
- identifying, using a set of one or more processors, a set of eligible receivables based on filtering information included in the fund information and the selected filter, wherein to identify the set of eligible receivables includes to:
  - obtain, from the data store, a preconfigured code portion corresponding to the filter selected based at least in part on the user interaction with respect to the visual representation of the filter;
  - query the data store for the one or more receivables under the insurance policy account to obtain set of eligible receivables, wherein the query includes the preconfigured code portion corresponding to the filter selected based at least in part on the user interaction with respect to the visual representation of the filter; and
  - load the set of eligible receivables into memory;
- establishing a set of ranked receivable partitions to which the fund is applied based on a set of preconfigured priority criteria and using the fund information and information associated with the set of eligible receivables; and
- applying the fund to the ranked receivable partitions according to rankings.

16. A computer program product, the computer program product being embodied in a non-transitory tangible computer readable storage medium and comprising computer instructions for:
- storing, in a data store, preconfigured code portions corresponding to a set of candidate filters;
- displaying, in a user interface, visual representations of the set of candidate filters;
- receiving, via the user interface, a user interaction with respect to a visual representation of a filter in the set of candidate filters, wherein the filter is selected based at least in part on the user interaction with respect to the visual representation of the filter;
- receiving fund information pertaining to a fund that is to be applied to one or more receivables under an insurance policy account;
- identifying a set of eligible receivables based on filtering information included in the fund information and the selected filter, wherein to identify the set of eligible receivables includes to:
  - obtain, from the data store, a preconfigured code portion corresponding to the filter selected based at least in part on the user interaction with respect to the visual representation of the filter;
  - query the data store for the one or more receivables under the insurance policy account to obtain the set of eligible receivables, wherein the query includes the preconfigured code portion corresponding to the filter selected based at least in part on the user interaction with respect to the visual representation of the filter; and
  - load the set of eligible receivables into memory;
- establishing a set of ranked receivable partitions to which the fund is applied based on a set of preconfigured priority criteria and using the fund information and information associated with the set of eligible receivables; and
- applying the fund to the ranked receivable partitions according to rankings.

* * * * *